(12) United States Patent
Claydon et al.

(10) Patent No.: US 8,436,918 B2
(45) Date of Patent: May 7, 2013

(54) SYSTEMS, APPARATUS AND METHODS FOR SUBTITLING FOR STEREOSCOPIC CONTENT

(75) Inventors: Laurence James Claydon, Buckinghamshire (GB); Jonathan Frank David Gardner, Berkshire (GB); Richard Corne, Buckinghamshire (GB); Ruopeng Wang, Santa Clarita, CA (US); Jeffrey McDermott, Castaic, CA (US)

(73) Assignee: Deluxe Laboratories, Inc., Hollywood, CA (US)

( * ) Notice: Subject to any disclaimer, the term of this patent is extended or adjusted under 35 U.S.C. 154(b) by 422 days.

(21) Appl. No.: 12/713,685

(22) Filed: Feb. 26, 2010

(65) Prior Publication Data

US 2010/0220175 A1 Sep. 2, 2010

Related U.S. Application Data

(60) Provisional application No. 61/156,159, filed on Feb. 27, 2009.

(51) Int. Cl.
*H04N 2101/00* (2006.01)
*H04N 5/772* (2006.01)
*H04N 5/23293* (2006.01)
*H04N 5/262* (2006.01)

(52) U.S. Cl.
USPC .............. 348/239; 386/341; 386/241; 348/43; 348/51; 345/419

(58) Field of Classification Search .................. None
See application file for complete search history.

(56) References Cited

U.S. PATENT DOCUMENTS

| 2004/0125447 A1 | 7/2004 | Sato et al. |
| 2007/0288844 A1 | 12/2007 | Zingher et al. |

(Continued)

FOREIGN PATENT DOCUMENTS

| EP | 0735784 | 10/1996 |
| JP | 2004274125 | 9/2004 |

(Continued)

OTHER PUBLICATIONS

Tsuneo Negawa, et al., M Pathway and Areas 44 and 45 Are Involved in Steroscopic Recognition Based on Binocular Disparity, Japanese Journal of Physiology, vol. 52, 191-198, No. 2, 2002.

(Continued)

*Primary Examiner* — Sath V Perungavoor
*Assistant Examiner* — Dakshesh Parikh
(74) *Attorney, Agent, or Firm* — Fitch, Even, Tabin & Flannery LLP

(57) ABSTRACT

Systems, apparatus and methods are provided for the real-time positional manipulation of stereoscopic (3D) subtitles in a stereoscopic viewing environment. A stereoscopic subtitling workstation is provided for creating stereoscopic subtitling content for use with stereoscopic video content in which stereoscopic subtitling content can be manipulated and adjusted in real-time in a stereoscopic viewing environment to set the desired viewing position and appearance parameters for the stereoscopic subtitling content. The stereoscopic subtitling workstation may further automatically analyze the stereoscopic video content and automatically generate optimal viewing parameters for the stereoscopic subtitling content, including its 3D offset, according to desired appearances and interaction between such content. The automatically generated stereoscopic subtitling content parameters could then use the real-time manipulation features of the workstation to further fine tune the automatically generated stereoscopic subtitling content parameters.

21 Claims, 14 Drawing Sheets

U.S. PATENT DOCUMENTS

| | | | | |
|---|---|---|---|---|
| 2008/0018731 | A1 | 1/2008 | Era | |
| 2009/0142041 | A1 * | 6/2009 | Nagasawa et al. ............ | 386/124 |

FOREIGN PATENT DOCUMENTS

| | | | |
|---|---|---|---|
| KR | 10-2002-0036371 A | 5/2002 |
| KR | 10-2008-0105343 A | 12/2008 |
| WO | WO 2008-038205 A2 | 4/2008 |
| WO | WO-2008115222 | 9/2008 |

OTHER PUBLICATIONS

Eric N. Wiebe, et al., Answering Questions With 2D and 3D Topographic Maps: Use of Eye-Tracking to Understand Representational Reasoning, Proceedings of the NARST 2005 Annual Meeting (Dallas, TX, U.S.) National Association for Research in Science Teaching (NARST) Apr. 1-3, 2004.

Laurence Claydon, Subtitling for Stereoscopic Content, Deluxe Digital London, Presentation Materials at IBC Conference, Sep. 14, 2008.

PCT International Search Report, Oct. 13, 2010.

PCT Written Opinion of the International Search Authority, Oct. 13, 2010.

Cinecanvas Subtitle Specification Version 1.1, Texas Instruments, Sheets 1-36, 2005.

Extended European Search Report for European Patent Application No. 10746945.4 mailed from the European Patent Office on Nov. 22, 2012.

* cited by examiner

```
<?xml version="1.0" encoding="UTF-8" ?>
- <!--                                  -->
- <!--                                   -->
- <!--                          -->

- <DCSubtitle Version="1.0">
  <SubtitleID>3DC15FC7-2905-4E08-ACE0-BE6069CABE09</SubtitleID>
  <MovieTitle>Subtitle Automation</MovieTitle>
  <ReelNumber>1</ReelNumber>
  <Language>English</Language>

  <LoadFont Id="Arial" URI="arial.ttf" />
- <Font Id="Arial" Color="FFFFFFFF"

Shadow="yes" ShadowColor="FF000000" ShadowOffset="3" ShadowFeather="2"
Outline="yes" OutlineColor="FF000000" OutlineSize="1" OutlineFeather="FF000000"

Italic="no" Script="normal" Size="38" Underlined="no" Weight="normal">

- <Subtitle SpotNumber="0001" TimeIn="00:00:12:166" TimeOut="00:00:14:239" FadeUpTime="0" FadeDownTime="0">
- <Text VAlign="bottom" VPosition="14.50" HAlign="center" HPosition="0" ZPosition="10"><Font Italic="yes">Niets ging zoals voorzien.</Font></Text>
   </Subtitle>

- <Subtitle SpotNumber="0002" TimeIn="00:00:15:031" TimeOut="00:00:18:114" FadeUpTime="0" FadeDownTime="0">
  <Text VAlign="bottom" VPosition="20.50" HAlign="center" HPosition="0" ZPosition="15">KURTULUŞ GÜNÜ</Text>
  <Text VAlign="bottom" VPosition="14.50" HAlign="center" HPosition="0" ZPosition="15">SİZİ GEÇMİŞTE BİR YOLCULUĞA</Text>
    </Subtitle>

    </Font>
    </DCSubtitle>
```

Fig. 5

Subtitle with standard 2 pixel outline.

Subtitle with outline feathered by 2 pixals.

Subtitle with outline feathered by 15 for comparison.

Subtitle with feathered outline and 5 pixel sharp shadow.

Subtitle with feathered outline and 5 pixel shadow with 5 pixel feather.

SYSTEMS, APPARATUS AND METHODS FOR SUBTITLING FOR STEREOSCOPIC CONTENT

RELATED APPLICATION

This application claims the benefit of and priority to U.S. Provisional Application Ser. No. 61/156,159, filed Feb. 27, 2009, entitled, "Subtitling for Stereoscopic Content," the contents of which are incorporated by reference herein in its entirety.

TECHNICAL FIELD

This disclosure relates generally to systems, apparatus and methods for subtitling for stereoscopic content.

BACKGROUND

Conventional motion picture, television and video display and viewing has occurred using two-dimensional (2D) content. Recent technological advances have led to the improved quality of stereoscopic or three-dimensional (3D) content being displayed on 2D display screens, where stereoscopic content provides the illusion of depth perception to the viewer by altering the viewer's focal point for portions of the content. This has led to the more frequent release of motion pictures, television programs and other video content as stereoscopic video content.

After a motion picture or television program has been produced, it is often released and displayed worldwide in a variety of different countries that speak different languages. It is thus common practice to prepare and superimpose subtitles in different respective languages over the motion picture or television program for each different region or country where the content is being displayed. Subtitles are also often included with motion pictures and television programs in association with closed captioning for the hard of hearing.

One of the challenges imposed by stereoscopic video content is that eye fatigue and motion sickness can sometimes be experienced by viewers when there are frequent changes in the focal point of the stereoscopic video content. The display of subtitles on stereoscopic video content can require viewers to frequently switch their eye focus between that of the subtitling and the focal point of the video content being displayed, where this can cause even greater eye fatigue and discomfort for a viewer. Conventional subtitling is prepared as 2D content. However, the display of 2D subtitling simultaneously with stereoscopic video content is undesirable, as it will cause such constant switching of eye focus between the focal point of the display screen for 2D content and the focal point of the stereoscopic video content that will create eye fatigue and strain. Further, the use of stereoscopic subtitles together with the stereoscopic video content can also be challenging, because if the perceived depth of the stereoscopic subtitles interferes with the 3D action (i.e., the focal point of a scene) in the stereoscopic video content, then the viewer could have difficulty viewing either of the video content or the subtitles and could possibly experience eye fatigue and strain.

SUMMARY

According to one or more aspects of the disclosure, systems, apparatus and methods are provided for the real-time positional manipulation of stereoscopic (3D) subtitles in a stereoscopic viewing environment. By allowing the position and appearance of stereoscopic subtitles to be manipulated in real-time while in a stereoscopic viewing environment, synchronization, timing, and typographic error checking of the subtitles can be achieved while also verifying positional avoidance of such stereoscopic subtitles with the on-screen action of images in the stereoscopic video content. In accordance with one or more aspects, a stereoscopic subtitling workstation is provided for creating stereoscopic subtitling content for use with stereoscopic video content in which the stereoscopic subtitling workstation is further configured to allow the stereoscopic subtitling content to be manipulated and adjusted in real-time in a stereoscopic viewing environment to set the desired viewing position and appearance parameters for the stereoscopic subtitling content.

In accordance with one or more aspects of the disclosure, the stereoscopic subtitling workstation converts subtitle content into stereoscopic subtitling content by creating respective left eye subtitle content and right eye subtitle content and then determining a desired parallax offset (i.e., 3D depth) between the left and right eye subtitle content To identify the desired parallax offset, amongst other desired parameters, the stereoscopic subtitling workstation overlays the left and right eye subtitle content over respectively synchronized left and right eye video content, thereby producing combined stereoscopic content having synchronized stereoscopic subtitling content and stereoscopic video content. The combined stereoscopic content is fed into a stereoscopic output device for alternating left eye and right eye display (i.e., stereoscopic display) to a viewer on a display screen in a stereoscopic viewing environment. The stereoscopic subtitling workstation then allows for real-time control and manipulation of the stereoscopic subtitles on the display screen so as to determine the optimal display parameters for the stereoscopic subtitling content so that the subtitles do not interfere with the 3D action of the underlying stereoscopic video content.

In accordance with one or more aspects of the present disclosure, the stereoscopic subtitling workstation may be configured to automatically analyze the stereoscopic video content and automatically generate the optimal viewing parameters for the stereoscopic subtitling content, including its 3D offset, according to desired appearances and interaction between the content. This automatic generation of stereoscopic subtitling content parameters allows for even greater efficiency, time and cost savings, and uniformity in the stereoscopic subtitling content parameters by analyzing the stereoscopic video content according to objective testing algorithms. In accordance with one or more aspects, an experienced user of the stereoscopic subtitling workstation could then use the real-time manipulation features of the workstation to further fine tune the automatically generated stereoscopic subtitling content parameters.

DRAWINGS

The above-mentioned features and objects of the present disclosure will become more apparent with reference to the following description taken in conjunction with the accompanying drawings wherein like reference numerals denote like elements and in which:

FIG. 5 is an example output D-Cinema xml file with parameters for stereoscopic subtitles in accordance with one exemplary embodiment of the present disclosure.

DETAILED DESCRIPTION

The present disclosure is directed to improved systems, apparatus and methods for preparing subtitling for stereoscopic content. In the following description, numerous embodiments are set forth in order to provide a thorough understanding of the invention. It will be apparent, however, to one skilled in the art, that these and other embodiments may be practiced without these specific details. In other instances, well-known features have not been described in detail in order not to obscure the invention.

Stereoscopic content, as the term is used herein, shall refer to video, picture or image content that is capable of stereoscopic viewing. Stereoscopic content may also be interchangeably used herein with the term 3D content. Stereoscopic content may comprise motion pictures, television broadcasts, content broadcast over the Internet or other networks, or any video, picture or image content that is transmitted or stored on a storage medium for playback (e.g., Digital Cinema, DVD, Blu-ray disc, digital video recorder, set top box, mobile phone or other mobile hand held device, etc.).

There are a variety of different techniques for providing stereoscopic viewing of stereoscopic or 3D video content. However, the majority of stereoscopic content is prepared using parallax content and the specific embodiments described herein will directed to preparing subtitling for stereoscopic content using parallax information, where the various embodiments described herein may be adapted for preparing subtitling for stereoscopic content for other stereoscopic techniques as well.

Parallax is a difference in the apparent position of an object viewed along two different lines of sight. Parallax is measured by the angle of inclination at the intersection between those two lines of sight. Human eyes have overlapping visual fields between the left and right eye to use parallax to gain depth perception. Stereoscopic content based on parallax content includes left eye content that can only be viewed by a viewer's left eye and right eye content that can only be viewed by a viewer's right eye. Stereoscopic viewing or 3D depth is realized by the viewer when the left eye content and right eye content are processed by the viewer as if coming from different angles and combined together by the viewer as if such content is being seen by the left and right eyes from different angles. The parallax can then be adjusted to create the desired 3D depth with respect to the display screen.

Figure 1A:
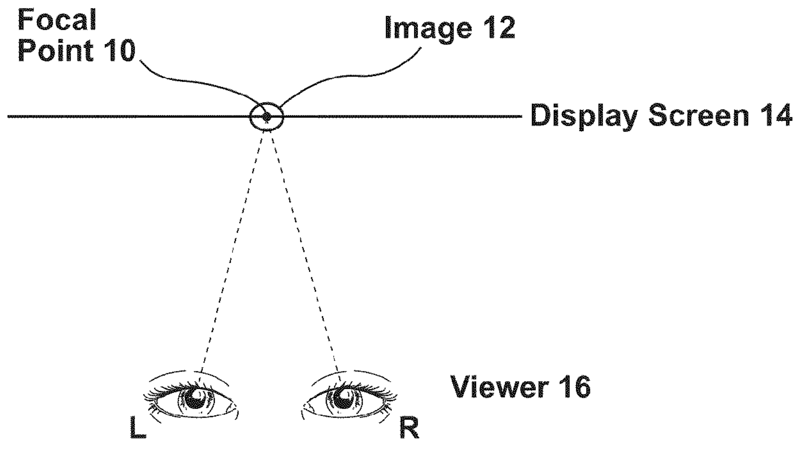
FIGS. 1A, 1B and 1C are top view schematic illustrations of how parallax is utilized with stereoscopic video content to create the perception of 3D depth to a viewer.
Figure 1B:
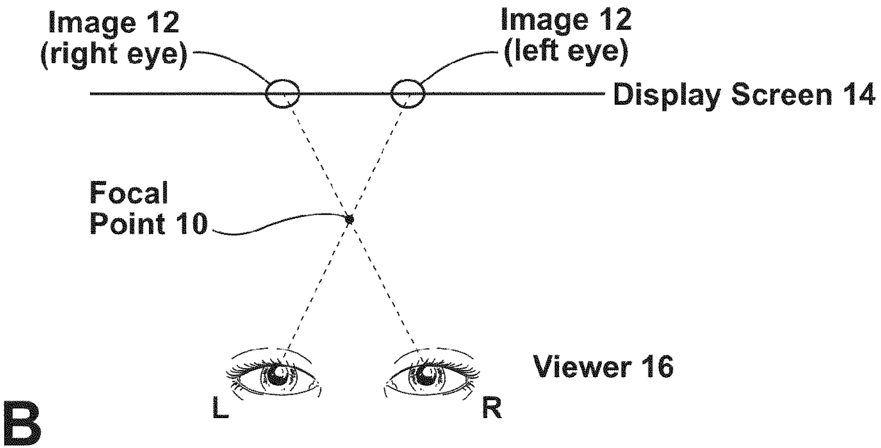
Figure 1C:
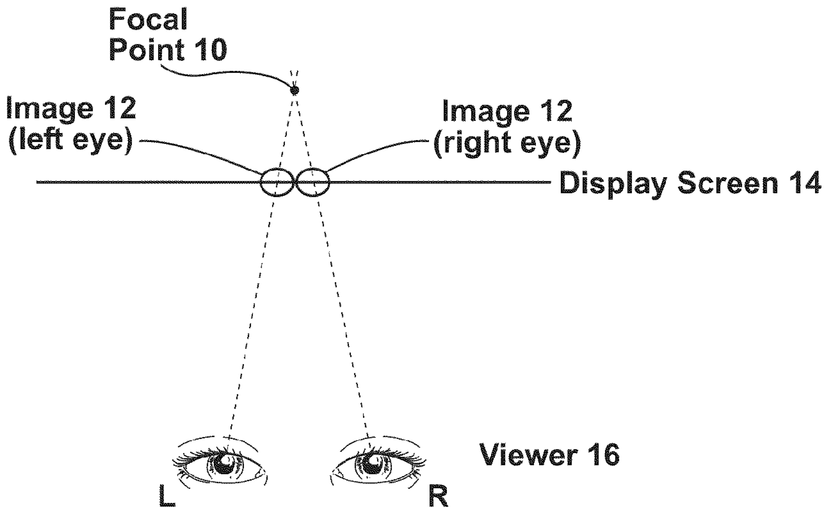

Referring now to FIGS. 1A, 1B and 1C, the concept of how parallax can be adjusted to create a desired 3D depth for stereoscopic content is illustrated. FIG. 1A represents the situation where the focal point 10 for an image 12 of the stereoscopic video content being displayed is exactly at a display screen 14 being viewed by a viewer 16 (having left and right eyes). This is always the situation for conventional 2D content viewing, because there is only a single image in 2D content to be viewed on the display screen by both the left and right eyes of a viewer 16. FIG. 1B represents the situation where the left eye image of image 12 and the right eye image of image 12 have been offset on the display screen to cause the focal point 10 for the image 12 being displayed to be in front of the display screen 14 being viewed by a viewer 16 (i.e., the image 12 appears to the viewer 16 as if it is closer to the viewer 16 than the display screen 14). FIG. 1C represents the situation where the left eye image of image 12 and the right eye image of image 12 have been offset on the display screen to cause the focal point 10 for the image 12 being displayed to be behind the display screen 14 being viewed by a viewer 16 (i.e., the image 12 appears to the viewer 16 as if it is further away from the viewer 16 than the display screen 14). As can be seen from the examples illustrated in FIGS. 1A, 1B and 1C, a desired 3D depth perceived by a viewer 16 for images 12 appearing in the stereoscopic content can be adjusted by adjusting the parallax offset (i.e., adjusting the offset of where the image 12 seen by the left eye appears on the display screen 14 with respect to where the image 12 is seen by the right eye). In other words, the left eye content and right eye content can be shifted or offset horizontally with respect to one another on the display screen 14 to create a stereoscopic or 3D viewing experience.

Various techniques exist for allowing the left eye content and right eye content of the stereoscopic content to only be seen by the corresponding left or right eyes of a viewer. For example, left eye content and right eye content can be alternately displayed on the display screen 14, where the viewer 16 may wear glasses that are configured to only allow the viewer's left eye to view the left eye content and only allow the viewer's right eye to view the right eye content. One current technique used for such types of 3D glasses include liquid crystal shutters for the left and right lenses of the glasses that alternatively open and close in conjunction with the left eye content and right eye content being alternately displayed on the display screen 14, such that left eye content or right eye content only reaches the respective left or right eyes of the viewer 16 when the shutters are in their open state.

Another current technique used for such 3D glasses involves the use of separately polarized left and rights lenses in the glasses, such that the stereoscopic content is polarized and the polarized lenses are formed to filter content, such that the left lens only allows the left eye content through to the left eye and the right lens only allows the right eye content through to the right eye. The foregoing examples are not intended to limit the potential applications of the present embodiments, as any known or future developed techniques for viewing stereoscopic content in a stereoscopic viewing environment may be employed with the various embodiments of the present invention.

Subtitling

In the motion picture industry, subtitling of dialogue occurring in the spoken language of the original version using foreign subtitling for foreign motion picture releases is the most cost effective and timely method of translation, where it is often desirable for the foreign motion pictures to be released near simultaneously with release of the original language version of the motion pictures. With these time considerations, it would be extremely difficult and costly to prepare translated soundtracks for each of the foreign motion picture releases. Thus, for the EMEA market, it is standard practice for approximately seventy percent (70%) or more of the English language content translation occurring via foreign language subtitles. Since many motion pictures are released worldwide, a large number of foreign language subtitles (e.g., often 20-30 or more different foreign language versions) must be prepared and synchronized with dialog in the motion picture in a very short period of time in order to accomplish the near simultaneous worldwide release of a motion picture.

Furthermore, with respect to theatrical releases of motion pictures, there is move for standardization in some countries of theater-selectable subtitling for the Hard of Hearing. This subtitling must be available for ‘Access’ screenings, which most theaters have had available as a result of synchronized-to-film systems, such as DTS-CSS and Dolby Screentalk®. Subtitling for Digital Cinema (“D-Cinema”) works in a similar synchronized way, with the D-Cinema projector rendering the subtitles onto the background, where some replay systems also offer this functionality. In each case, the subtitling may be enabled or disabled by the projectionist. Subtitling for stereoscopic content using the above conventional method is compromised and undesirable, as the subtitles could only be rendered in 2D by the projector, and if overlaid on a stereoscopic image, could severely conflict with the action and potentially cause eye fatigue for the viewer. Prior attempts to solve the display of 2D subtitling with stereoscopic content involved restricting the image area and hence picture size for the stereoscopic content in the theatre and render subtitles over a black banner outside of the image area, which in turn affects visual impact and negates part of the reason for making a stereoscopic presentation in the first place.

To avoid the above-described problems with 2D subtitling, attempts have been made to utilize stereoscopic subtitling in the same image area as the stereoscopic content. However, the use of stereoscopic subtitles together with the stereoscopic video content can be distracting and cause eye fatigue if the perceived 3D depth of the stereoscopic subtitling interferes with the 3D action (i.e., the focal point of an image) in the stereoscopic video content. Prior to the present invention, in order to ensure that subtitles for stereoscopic video content do not interfere with the action in the associated video content, a costly, time-consuming and labor intensive trial-and-error methodology was required during the motion picture production process in which a subtitling production team needed to guess the appropriate parameters for the stereoscopic subtitles and then render the stereoscopic subtitles together with the stereoscopic video content on a medium containing the motion picture. The rendered motion picture would then be displayed on a display screen (e.g., a movie theater screen) and viewed to determine whether the stereoscopic subtitling created eye strain or conflicted with the 3D images (i.e., focal point of the action) in the stereoscopic video content. If such problems existed, then the process would start over again with corrections being made to the stereoscopic subtitles and the content rendered and viewed again, where the overall process would have to be repeated over and over again until the desired results were achieved. This costly, time-consuming and labor intensive procedure for inserting stereoscopic subtitling into stereoscopic video content is compounded by the necessity to prepare foreign language subtitles in a variety of different languages for worldwide motion picture releases, where each respective foreign language subtitle will occupy a different image area on the display screen and require individual analysis for each foreign language release. For example, words and phrases in one language may be longer or shorter than in other languages, and some languages are read and written left to right while other languages may be read and written right to left or top to bottom. These differences between the languages require the parameters for the subtitles to be separately assessed for each foreign language release.

While the above example describes the process for motion picture releases, similar costly, time-consuming and labor intensive procedures are similarly required when stereoscopic motion pictures are subsequently released on media for distribution to the public (e.g., through DVD or Blu-ray releases or made available for download or other viewing or other straight-to-video products). For these subsequent releases, the content producers have previously been required to perform similar trial-and-error procedures for positioning stereoscopic subtitles by guessing subtitle parameters, rendering an output product, and viewing the output product on an appropriate display screen for the corresponding content (e.g., a television display or computer display). To overcome these costly, time-consuming and labor intensive procedures associated with stereoscopic subtitling, the present inventors have developed various improved systems, apparatus and methods for subtitling for stereoscopic content, including the use of a stereoscopic subtitling workstation that allows for real-time positional manipulation of stereoscopic subtitles in a stereoscopic viewing environment and further allows for optimized stereoscopic subtitle parameters to be automatically determined based on the associated stereoscopic video content.

Stereoscopic Subtitling Workstation

Figure 2:
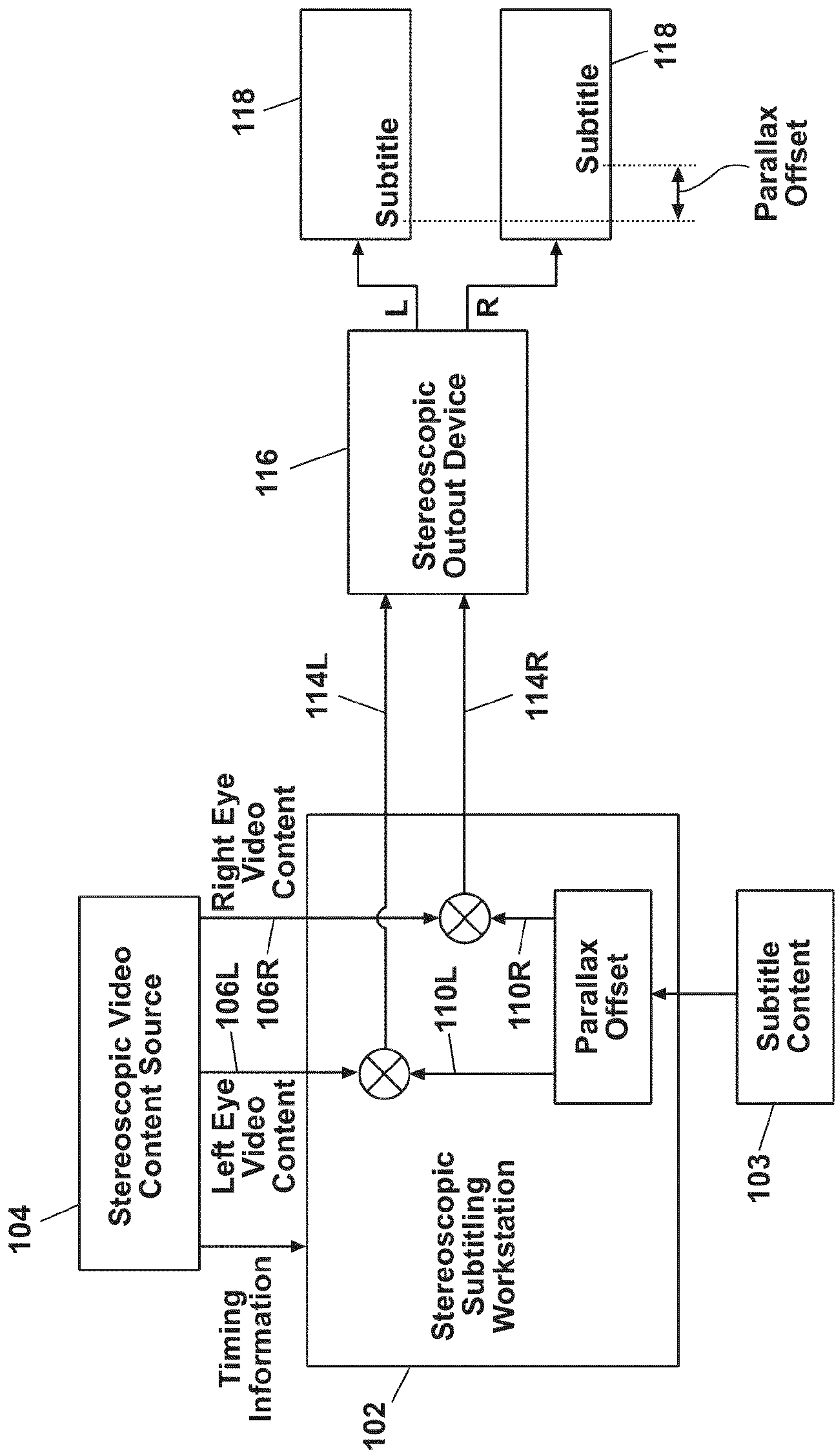
FIG. 2 is a block schematic representation of a system for preparing stereoscopic subtitling content for stereoscopic video content in accordance with one or more embodiments of the present disclosure.

In one or more embodiments, a system 100 is provided including a stereoscopic subtitling workstation 102 to allow for such real-time positional simulation of stereoscopic subtitles in a stereoscopic viewing environment, as illustrated in the schematic illustration of FIG. 2. By manipulating the position and appearance of stereoscopic subtitles while in a stereoscopic viewing environment, synchronization, timing, and typographic error checking of the subtitles can be efficiently achieved while also verifying positional avoidance of such stereoscopic subtitles with the on-screen action of images in the stereoscopic video content.

The system 100 includes a stereoscopic video content source 104 for outputting respective left eye content 106L and right eye content 106R of the stereoscopic video content to which subtitling is to be added. In one or more embodiments, the stereoscopic video content source 104 may comprise a digital cinema production replay system. In one or more embodiments, the stereoscopic video content source 104 may comprise a Blu-ray 3D disc player. In other embodiments, stereoscopic video content source 104 may comprise any source of stereoscopic video content. Stereoscopic video content source 104 further contains timing information 108 relating to when images in the respective left eye video content 106L and right eye video content 106R are to be displayed. In one or more embodiments, the stereoscopic subtitling workstation 102 is positioned to receive stereoscopic video content (i.e., left eye video content 106L and right eye video content 106R) and timing information 108 from the stereoscopic video content source 104. Subtitle content 103 that has been prepared for the stereoscopic video content is also transmitted or otherwise provided to the stereoscopic subtitling workstation 102, which is configured to synchronize and control the on-screen timing of the subtitle content 103 with respect to the stereoscopic video content (106L and 106R).

Figure 3:
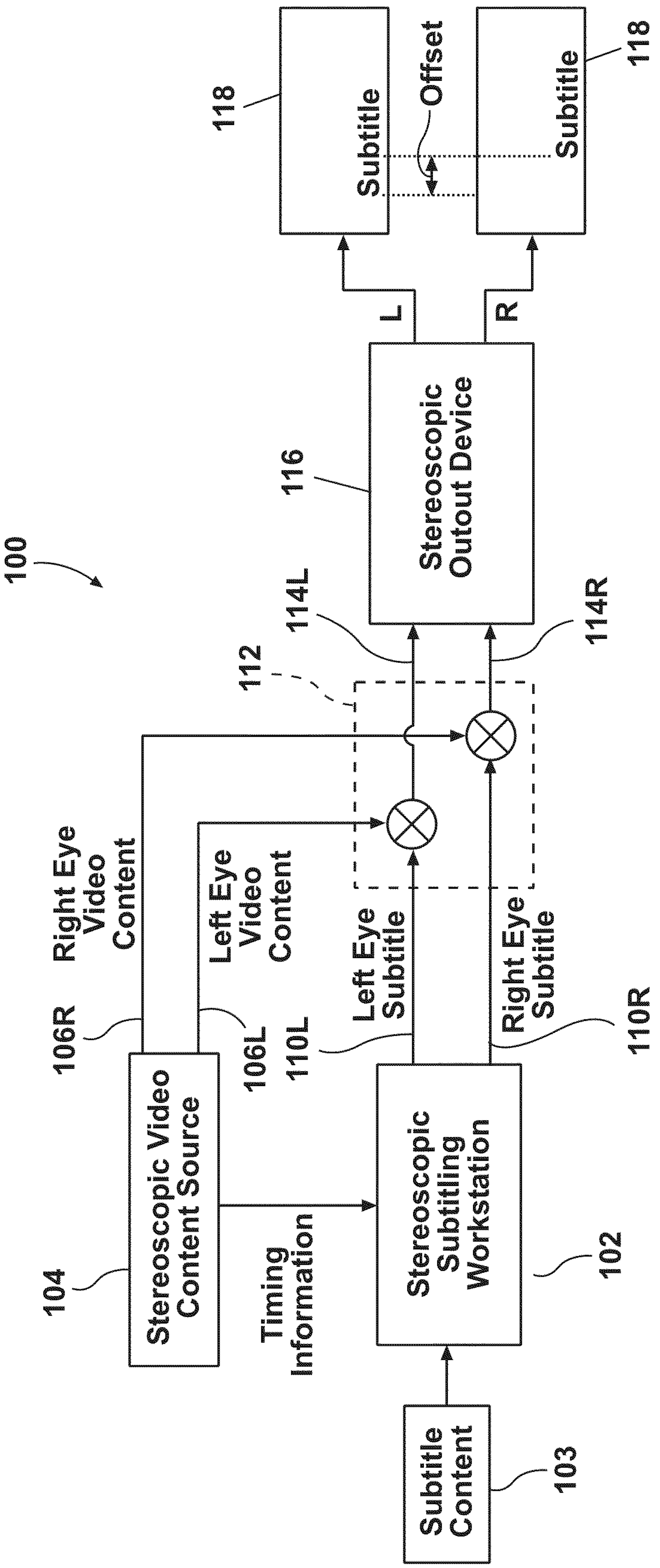
FIG. 3 is a block schematic representation of another system for preparing stereoscopic subtitling content for stereoscopic video content in accordance with one or more embodiments of the present disclosure.

The stereoscopic subtitling workstation 102 converts the received subtitle content 103 into stereoscopic subtitling content by determining a parallax offset for the respective left eye subtitle content 110L and right eye subtitle content 110R for each subtitle in the received subtitle content 103. The stereoscopic subtitling workstation 102 is further configured to allow the on-screen display of the stereoscopic subtitling content to be manipulated and adjusted in real-time in a stereoscopic viewing environment. To accomplish this real-time interaction between the stereoscopic subtitling content and the stereoscopic video content, the stereoscopic subtitling workstation 102 overlays the left and right eye subtitle content 110L and 110R over the respectively synchronized left and right eye video content 106L and 106R, thereby producing combined left eye content 114L and combined right eye content 114R having synchronized stereoscopic subtitling content and stereoscopic video content. The combined left and right eye content 114L and 114R are fed into a stereoscopic output device 116 for alternating display of left eye and right eye views on the display screen 118. In some embodiments, rather than combining the stereoscopic subtitling content and the stereoscopic video content within the stereoscopic subtitling workstation 102 itself, the stereoscopic subtitling content (110L and 110R) and the stereoscopic video content (106L and 106R) may be fed into a separate device, such as a subtitle overlay keyer 112, which overlays the stereoscopic subtitling content with respect to the synchronized incoming left and right eye images for the stereoscopic video content, as illustrated in FIG. 3.

In one or more embodiments, the entire system 100 can be situated in a stereoscopic viewing environment to allow the stereoscopic subtitles to be combined with the stereoscopic video content and displayed in real-time. This allows a user or viewer to instantaneously and in real-time manipulate the appearance and interaction of the stereoscopic subtitles with respect to the on-screen action of images in the stereoscopic video content on the display screen 118. For example, in one or more embodiments, a viewer may wear stereoscopic glasses for periods of time while utilizing the system 100 in order to view the content stereoscopically and make this manipulate of the appearance and interaction between the stereoscopic subtitles and the stereoscopic video content on the display screen 118.

In one or more embodiments, the stereoscopic subtitling workstation 102 allows for real-time positioning of stereoscopic subtitles on the display screen 118, where such positioning can either be i) manipulated and controlled by a user of the stereoscopic subtitling workstation 102, ii) performed automatically using algorithms and programs running on the stereoscopic subtitling workstation 102, or iii) performed using a combination of both automatic and user-controlled procedures. Some positional attributes for subtitling that could be controlled may include, but are not limited to, 1) ensuring that the text of the subtitling appears within a 'safe' are of the display screen 118 so as not to conflict with other images being displayed, 2) ensuring that each line of text of the subtitling not exceed a certain length (e.g., so as to avoid the viewer/reader having to scan through wide angles on a large display screen that can distract from the stereoscopic video content, 3) ensuring that the text of the subtitling be of sufficient size and font to be easily viewed and read all possible viewing location with respect to the display screen 118, 4) ensuring that the timing and positioning of the text of the subtitling not interfere with on-screen images and action (e.g., locator cards for translation), and 5) ensuring that the text of the subtitling not extend over cuts in the action being displayed with respect to the stereoscopic video content. Many of these positional considerations apply to both 2D and 3D subtitling content.

In one or more embodiments, the present inventors have determined that there are also particular positional attributes for stereoscopic subtitling that could advantageously be controlled and that may include, but are not limited to, 1) determining the proper focal point for the stereoscopic subtitling (i.e., a 3D offset or z-axis determination, as described below) so as to provide a desired appearance and interaction with respect to the stereoscopic video content, 2) enhancing the text of the subtitling with certain characteristics that assist in its visibility and legibility, and 3) reducing a 'ghost' or crosstalk image that can appear for stereoscopic subtitling using some stereoscopic display systems.

In one or more embodiments, when determining the proper focal point for the stereoscopic subtitling, it is ensured that the text of the subtitling appears stereoscopically to be closer to the viewer (i.e., 'just forward') than the perceived 3D depth or focal point for the images in a respective portion of the stereoscopic video content, unless action or image focal point is behind the plane of the display screen 118. It has been found that positioning the stereoscopic subtitling just forward of the perceived 3D depth of the action in a given image or scene of the stereoscopic video content provides the optimal viewing experience for the viewer. When the stereoscopic subtitling possesses the same 3D focal point as the action in a given scene, the viewer tends to struggle whether to view the stereoscopic subtitling or the stereoscopic video content, where the viewer often ends up switching focus between the stereoscopic subtitling and the stereoscopic video content, which can be distracting. Generally, positioning the stereoscopic subtitling 'behind" the action or image focal point in a given scene in the stereoscopic video content is undesirable, as the viewer has difficulty focusing on the stereoscopic subtitling. Thus, the present inventors have found that, in most instances, the preferable focal point for the stereoscopic subtitling is one that is slightly closer (i.e., 'just forward') of the perceived 3D depth of the action (or image focal point) in a corresponding portion of the stereoscopic video content. However, it is understood that a variety of different focal points for stereoscopic subtitling may be selected with respect to its corresponding stereoscopic video content, depending upon the desired appearance and interaction between the stereoscopic subtitles and the stereoscopic video content on the display screen 118.

In one or more embodiments, the stereoscopic subtitling workstation 102 includes at least one display for displaying a graphical user interface (GUI) to a user of the workstation 102 and further includes at least one least one input device (e.g., keyboard, mouse, touch screen, keypad, etc.) that allows a user to make selections and/or otherwise provide input into the workstation 102. The GUI includes a plurality of control icons that are selectable by a user and data input fields that allow the user to input, modify or otherwise select the desired parameters for the stereoscopic subtitles.

Figure 4:
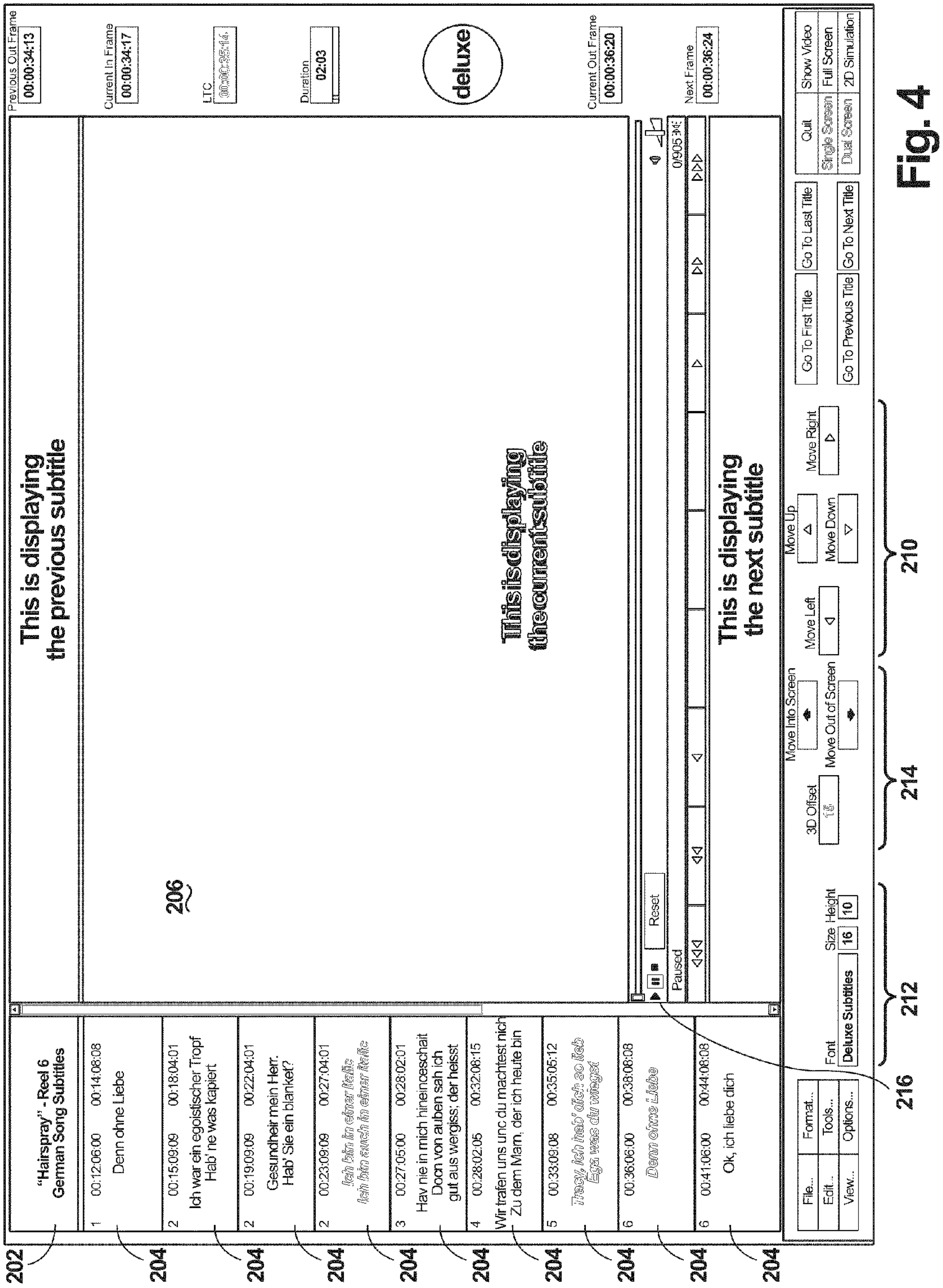
FIG. 4 is an exemplary graphical user interface (GUI) for the stereoscopic subtitling workstation in accordance with one or more embodiments of the present disclosure.

Referring now to FIG. 4, a representative screen shot of an exemplary GUI 200 for the stereoscopic subtitling workstation 102 is illustrated in accordance with one or more embodiments. The GUI 200 will include a plurality of selectable icons and fields that allow a user to input, modify or otherwise select the desired parameters for the stereoscopic subtitles. An identification field 202 is provided to identify the stereoscopic video content with which the subtitle content 103 is associated, such as the name of the motion picture or television program. Each of the individual subtitles of the subtitle content 103 are numerically listed in the order of their display in respective subtitle fields 204, where each subtitle field 204 includes the text of the subtitle to be displayed and the display time of the text (e.g., starting and ending times relative the stereoscopic video content). The particular subtitle field 204 selected by a user appears in the main display area 206, where the selected subtitle field 204 may also be highlighted, appear in a different color or otherwise differ in appearance from the other subtitle fields 204 so as identify is selection.

Once a subtitle field 204 is selected, the respective subtitle text 208 appears in the main display area 206, such that various control icons of the GUI 200 may then be used modify, select or otherwise manipulate the desired parameters for the selected subtitle. Main display area 206 corresponds to the display area of the display screen 118.

The stereoscopic subtitling workstation 102 may further include a media player (e.g., Window Media (WMV) or QuickTime or other media player) that allows the video content to be displayed in 2D in the main display area 206. In some embodiments, the main display area 206 may even display content in 3D and function equivalently as display screen 118. The position of the subtitle 208 may be moved by a user using positional icons 210 (e.g., up, down, left and right arrows) or by clicking and dragging the subtitle 208 using a mouse (not shown) connected to the workstation 102. Characteristics of the font of the subtitle 208 may be selected in the font input fields 212, such as font type, font size, character height, word spacing, etc.

The stereoscopic properties of the subtitle 208 may be selected or adjusted using the 3D offset input 214, which may include fields where a user may input a desired 3D offset or may include icons that allow the value of the 3D offset (i.e., parallax offset) to be increased or decreased. The 3D offset or parallax offset is also sometimes referred to as the z-axis value or z-value for stereoscopic content. The 3D offset input 214 shown in FIG. 4 includes a "Move Into Screen" icon and a "Move Out of Screen" icon that may be selected to adjust the 3D offset value. In a 3D viewing mode, the subtitle 208 appearing in the main display area 206 actually includes both left eye subtitle content (e.g., 110L from FIGS. 2 and 3) and right eye subtitle content (e.g., 110R from FIGS. 2 and 3), where the left and right eye subtitle content are shifted horizontally with respect to one another based on the selected 3D offset value. Once the parameters have been set on the workstation 102, a user may then play (e.g., by selecting the play icon 216) the synchronized portion of the stereoscopic video content associated with the particular subtitle 208, where the subtitle 208 will be overlaid on the stereoscopic video content according to the selected parameters and displayed on the display screen 118 as described herein. This allows a user of the workstation 102 and/or viewer of the display screen 118 to instantaneously and in real-time examine and manipulate the appearance and interaction of the stereoscopic subtitle 208 with respect to the on-screen action of images in the corresponding stereoscopic video content being displayed on the display screen 118. The user can wait until a certain portion of the content has stopped playing or can stop the playing of the content at any time on the workstation 102. The user may then change any of the parameters of the subtitle 208 using the controls of GUI 200. For example, the user may change the timecodes (enter and exit times), the particular text of the subtitle 208, the font attributes, and the 3D offset. The revised parameter settings for the subtitle 208 could then be reviewed in a similar manner.

In one or more embodiments, the appearance and interaction of the stereoscopic subtitle 208 with the corresponding stereoscopic video content being displayed can be assessed on a subtitle-by-subtitle basis. Since the preferable focal point for the stereoscopic subtitling is one that is slightly closer (i.e., 'just forward') of the action or image focal point in a given scene of the corresponding stereoscopic video content, this preferable focal point or 3D offset value will vary for each respective subtitle depending upon the particular action or image focal point in the corresponding scenes of the stereoscopic video content. Since the 3D focal point for action occurring in stereoscopic video content may vary from scene to scene (or even within a scene) throughout the playback of the content to create different 3D effects and appearances for the viewer, the corresponding focal points for the stereoscopic text will similarly vary throughout the playback of the content.

Thus, it can be seen why the prior conventional, trial-and-error methodology of guessing the appropriate parameters for the stereoscopic subtitles, rendering stereoscopic subtitles together with the stereoscopic video content, viewing the rendered content for adjustments and then reiteratively repeating these steps was so costly, time-consuming and labor intensive. To the contrary, various embodiments of the present systems, apparatus and methods for subtitling for stereoscopic content allow for the real-time positional manipulation of stereoscopic subtitles in a stereoscopic viewing environment, thereby significantly reducing the time, costs and labor associated with preparing subtitling for stereoscopic content.

In one or more embodiments, the stereoscopic subtitling workstation 102 may further be configured to automatically analyze the stereoscopic video content and prepare suggested parameters for the stereoscopic subtitling content according to desired appearances and interaction between the content. For example, the stereoscopic subtitling workstation 102 may analyze the stereoscopic video content to determine the specific 3D offsets or focal points for all of the action throughout the stereoscopic video content (e.g., changing focal point of the action throughout a motion picture), where the corresponding subtitling content can be automatically set have its 3D offset set to a value according to a default incremental value so that the subtitling content has its default 3D offset to be set slightly closer to the viewer (i.e., 'just forward') of the action. This automatic analysis of the stereoscopic video content to prepare suggested parameters for the stereoscopic subtitling content may then be used as the final parameters for the subtitling or may be used a starting point for a user of the stereoscopic subtitling workstation 102 to being their analysis, so as to further reduce the costs, time and effort required to preparing subtitling for stereoscopic content.

In one or more embodiments, after the parameters for all of the stereoscopic subtitling content have been determined, the stereoscopic subtitling workstation 102 may store the stereoscopic subtitling content parameters in a file (e.g., an XML subtitle file or any other file format that can be used with stereoscopic content players) where this file can subsequently be utilized to render stereoscopic content for distribution for subsequent display or may be transmitted separately from the underlying stereoscopic video content and combined for display at appropriate locations. By way of example, the following stereoscopic subtitling content parameters may be contained in the stored subtitle file: text color (RGB) and transparency, font type, font effect (e.g., shadow), text in point (e.g., start time), text out point (e.g., stop time), fade up/down time, on screen position x and y (2D), outline color, outline size, outline feather, shadow color, shadow offset, shadow feather, and 3D or parallax offset (Z-axis position). An example output digital cinema xml file with parameters for stereoscopic subtitles is illustrated in FIG. 5.

The stored 3D or parallax offset (Z-axis position) for a given language version may subsequently be utilized for subsequent additional language versions of the same video content to serve as a starting point for the preparation of stereoscopic subtitling content for those subsequent additional language versions. For example, the stereoscopic subtitling workstation 102 may import, load or retrieve the file containing the stored 3D or parallax offset (Z-axis position) when preparing stereoscopic subtitling content subsequent language versions for the same video content, so as to be able to capitalize on the previous results obtained and further enhance the efficiency of the stereoscopic subtitling workstation 102 in preparing stereoscopic subtitling content. In one or more embodiments, in order to make use of previous Z-axis position determinations for stereoscopic subtitling content for the same stereoscopic video content, the stereoscopic subtitling workstation 102 may execute a Z-axis import algorithm embodied in a software module that holds Z-axis positions for a window of timing values on either side of a particular subtitle event. This allows for varied subtitle in and out point timing variations between language versions. This is known as a Z-axis position map, and may be derived manually on the first pass, or via an automated analysis of the background images of the stereoscopic video content.

Figure 6:
FIG. 6 is an exemplary screen shot illustrating representative font effects that can be utilized to improve the screen legibility of stereoscopic subtitling content in accordance with one or more embodiments of the present disclosure.

In one or more embodiments, the parameters for the stereoscopic subtitling content may further include various types of font effects can further be utilized to improve the screen visual legibility of stereoscopic subtitling content, such as but not limited to shadowing, feathering, outlining, and various combinations of these effects. In one or more embodiments, the text of the stereoscopic subtitling content may include a shadow font effect to improve screen visual legibility when applied to stereoscopic subtitles. Initially, the shadow provides a visual separation between the text of the subtitles and on-screen images associated with the stereoscopic video content, thereby improving legibility. Secondly, and more usefully, some on-screen action can, for very brief periods exhibit such significant parallax offset (for action that jumps out of the screen), that it would be impractical to place a subtitle ahead of it, as most viewers would suffer significant eye-strain if the subtitling appeared too close to the viewer. The drop shadow affords a degree of resistance to on screen action for the stereoscopic video content that momentarily passes ‘in front’ of the stereoscopic subtitling. It additionally has been found that a feathered outline adds an additional separation of the subtitle text from on-screen action. Various representative font effects that can be utilized to improve the screen visual legibility of stereoscopic subtitling content are illustrated in FIG. 6, including shadowing, feathering, outlining, and various combinations of these effects.

In one or more embodiments, the stereoscopic subtitling workstation 102 may further have algorithms and software modules stored and operated thereon that perform crosstalk compensation procedures on the stereoscopic subtitling content. Currently, some types of stereoscopic glasses that are used for viewing stereoscopic content will allow a small amount of crosstalk between the left eye image to the right eye and vice versa. If this crosstalk becomes significant, a ‘ghost’ of the image will appear on screen, and this can be distracting with larger values of parallax offset. Thus, the crosstalk compensation procedures implemented on the workstation 102 may compensate for the crosstalk that may appear in the displayed stereoscopic subtitling content by providing an inverted image of those subtitles in the left eye image on the right and vice versa, for stereoscopic subtitling content that is likely to cause appreciable crosstalk (e.g., above certain RGB code values, which have been mapped for a particular system). This can require that the black level of both the left and right subtitles be raised to the level of maximum crosstalk, in order that ‘true black’ be available for the inverse image. There are various types of crosstalk compensation procedures known to those skilled in the art which could be utilized.

In one or more embodiments, the stereoscopic subtitling content stereoscopic prepared by the subtitling workstation 102 may have crosstalk compensation corrections then “burned-in” into the stereoscopic subtitling content, or such crosstalk compensation corrections may alternatively be performed by a unit deployed at the display location between the replay system and output device (e.g., projector or television screen).

Automatic Subtitling Positioning

As described hereinabove, in one or more embodiments, the stereoscopic subtitling workstation 102 may be configured to automatically analyze the stereoscopic video content and automatically generate desired or optimal parameters for the stereoscopic subtitling content, including the 3D offset to be applied to the subtitle event, according to desired appearances and interaction between the content. This automatic generation of stereoscopic subtitling content parameters allows for even greater efficiency, time and cost savings, and further in uniformity in the stereoscopic subtitling content parameters by analyzing the stereoscopic video content according to objective testing algorithms. In one or more embodiments, an experienced user of the stereoscopic subtitling workstation 102 could then use the real-time manipulation features of the workstation 102 using GUI 200 to further fine tune the automatically generated stereoscopic subtitling content parameters.

Figure 7:
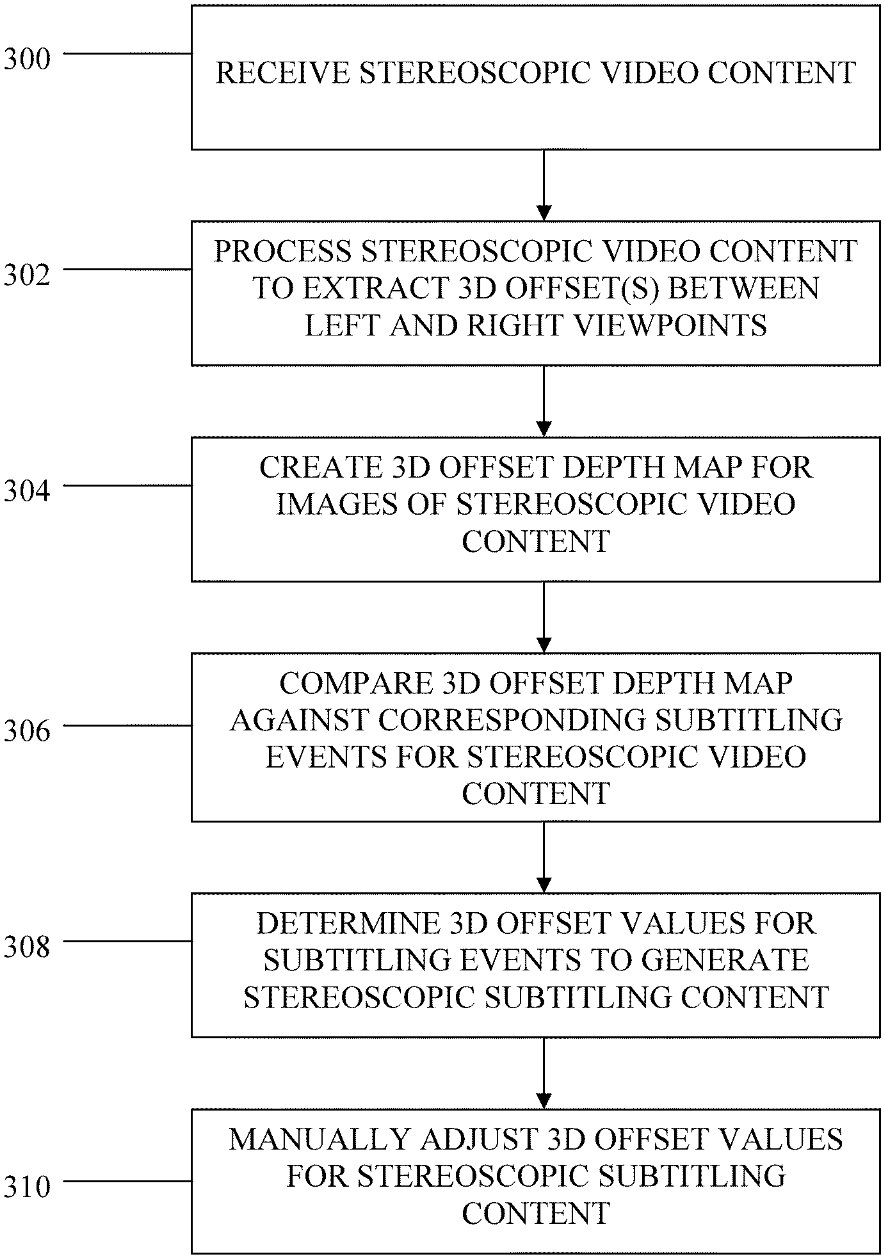
FIG. 7 is an operational flow diagram of an automatic subtitling positioning algorithm performed by the stereoscopic subtitling workstation in accordance with one or more embodiments of the present disclosure.

Referring now to FIG. 7, an operational flow diagram of an automatic subtitling positioning algorithm embodied in a software module performed by the stereoscopic subtitling workstation 102 in accordance with one or more embodiments is described. The automatic subtitling positioning algorithm includes 1) an offset extraction process for extracting 3D offset information from the stereoscopic video content, 2) an automated subtitle depth placement process for determining the automated desired 3D offset for the stereoscopic subtitling content (i.e., subtitle plane), and optionally 3) a further manual adjust process for performing fine tuning of the stereoscopic subtitling content parameters, such as by using the systems, apparatus and methods described herein.

The stereoscopic video content is initially received by the stereoscopic subtitling workstation 102 in operation 300 (e.g., from video content source 104), where steps of an offset extraction process are performed in operation 302 in order to extract 3D offset values between the left eye content 106L and right eye content 106R. In one or more embodiments, the left eye content 106L and right eye content 106R is analyzed with respect to one another in order to determine the associated 3D offset values. In some embodiments, the stereoscopic video content itself that is received by the stereoscopic subtitling workstation 102 may already contain previously determined associated 3D offset values for the left eye content 106L and right eye content 106R. Based upon the extracted (or previously determined) 3D offset values for the stereoscopic video content, a 3D offset depth map is generated in operation 304 for the images contained within the stereoscopic video content, such that the action or 3D focal point for the images contained within at least a portion of the stereoscopic video content.

In operation 306, each subtitling event is compared against corresponding 3D offset values from the 3D offset depth map for portions of the stereoscopic video content associated with the subtitling event. Each subtitle event includes associated subtitling parameters, such as but not limited to a collection of start time of the subtitle, the end time of the subtitle, the perimeter size of the subtitle (e.g., the height and width of a subtitle bounding box), and the x,y position of the subtitle (or the subtitle bounding box) in relation to its display on the display screen 118. Based on the comparison operation 306, a 3D offset value is then automatically generated for each subtitle event in operation 308 so as to generate the 3D offset values for all of the stereoscopic subtitling content. For example, the 3D offset values for the stereoscopic video content that are obtained from the 3D offset depth map for portions of the stereoscopic video content associated with the subtitling event can be assessed according to a desired criteria for the subtitle event, such as selecting the 3D offset value for the subtitle event to be closer to the viewer 16 than the specific one of those 3D offset values for the stereoscopic video content that is closest to the viewer 16 (i.e., most forward). In this manner, the subtitle event would then always be slightly closer or just forward of the corresponding 3D action of the images in the corresponding stereoscopic video content.

In one or more embodiments, after the 3D offset values for the stereoscopic video content are automatically obtained, the parameters for the subtitles in the stereoscopic video content may further be manually adjusted in operation 310 by viewing subtitles and video content together and fine tuning of the stereoscopic subtitling content parameters, such as by using the systems, apparatus and methods described herein.

Figure 8:
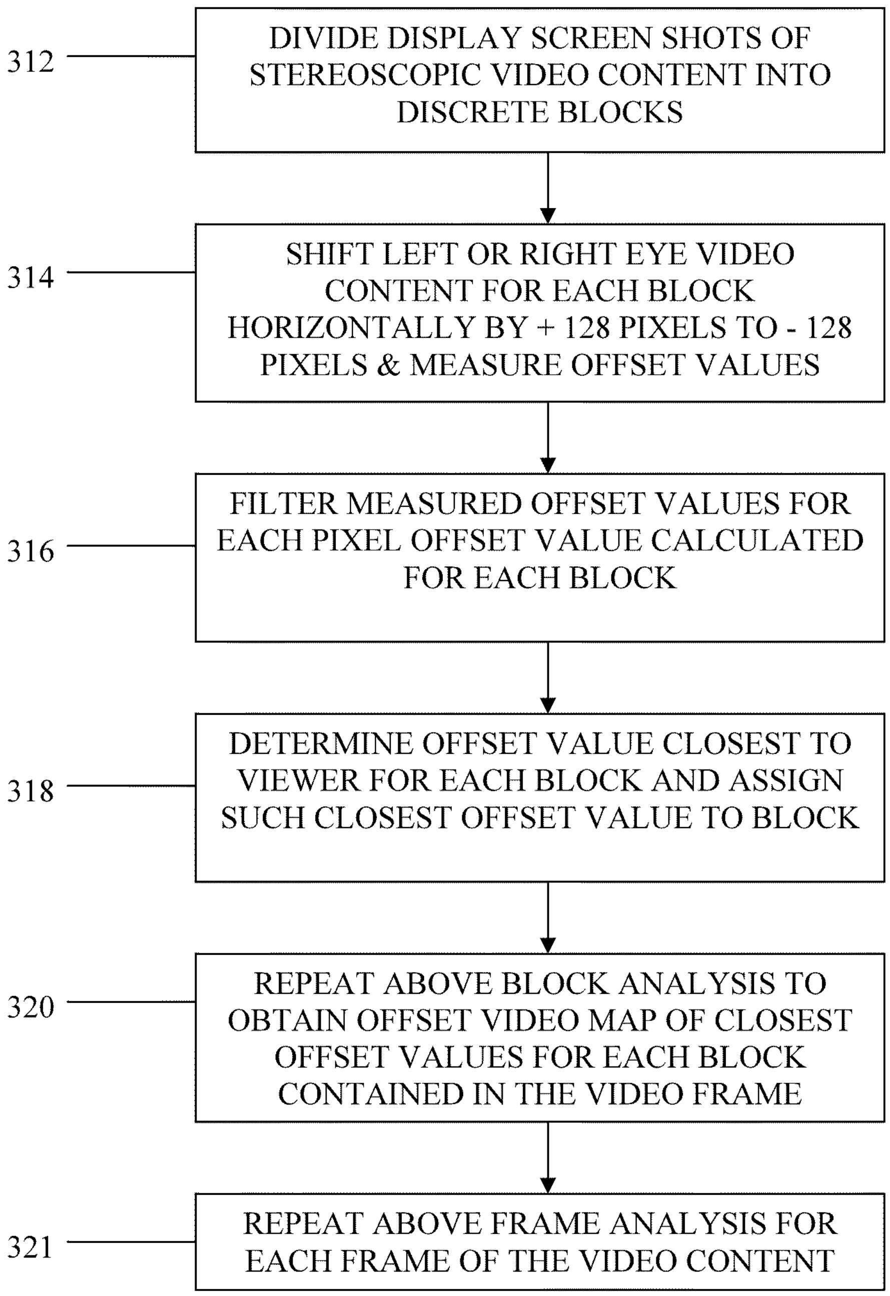
FIG. 8 is an operational flow diagram of an offset extraction process performed by the stereoscopic subtitling workstation in accordance with one or more embodiments of the present disclosure.
Figure 10A:
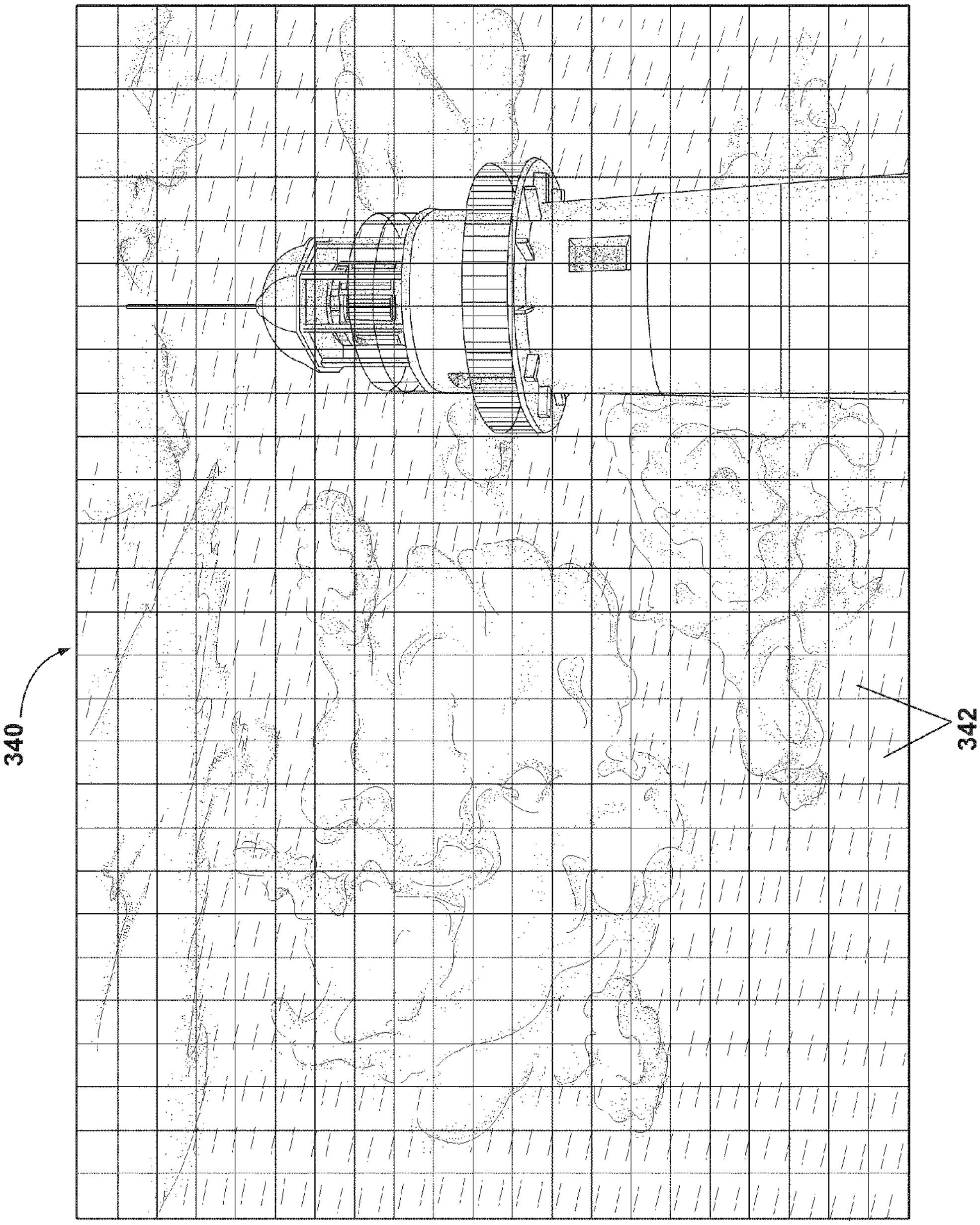
FIGS. 10A-10C are representative frames or screen shots of stereoscopic video content shown divided into a plurality of discrete image blocks in accordance with one or more embodiments of the present disclosure.

Referring now to FIG. 8, an operational flow diagram of the more specific aspects of the offset extraction process embodied in a software module performed by the stereoscopic subtitling workstation 102 in accordance with one or more embodiments is illustrated. The offset extraction process involves using both the left and right eye viewpoints from the stereoscopic video content source 104, where the left eye content 106L and right eye content 106R is analyzed with respect to one another in order to determine the associated 3D offset values. For a given frame in the stereoscopic video content, different respective images or portions of the frame may possess different 3D offset values or focal points for action. Thus, the offset extraction process initially involves dividing the display screen containing the frame or screen shot of stereoscopic video content into a plurality of discrete areas in operation 312. In one or more embodiments, the discrete areas are formed to be discrete blocks, although it is proposed that discrete areas of different shapes may be utilized. Reference will further be made to a representative frame or screen shot of stereoscopic video content shown in FIGS. 10A-10C to illustrate the functionality of the offset extraction process. As can be seen in FIG. 10A, a screen shot 340 containing displayed image data for stereoscopic video content (e.g., a frame from a motion picture or television program) is divided into a plurality of discrete image blocks 342. The particular size of the discrete image blocks 342 may be predetermined or may be variably selected, such as by a user selection, based on the type of stereoscopic video content being analyzed, or based on the type of display on which the stereoscopic video content will be displayed.

Figure 10B:
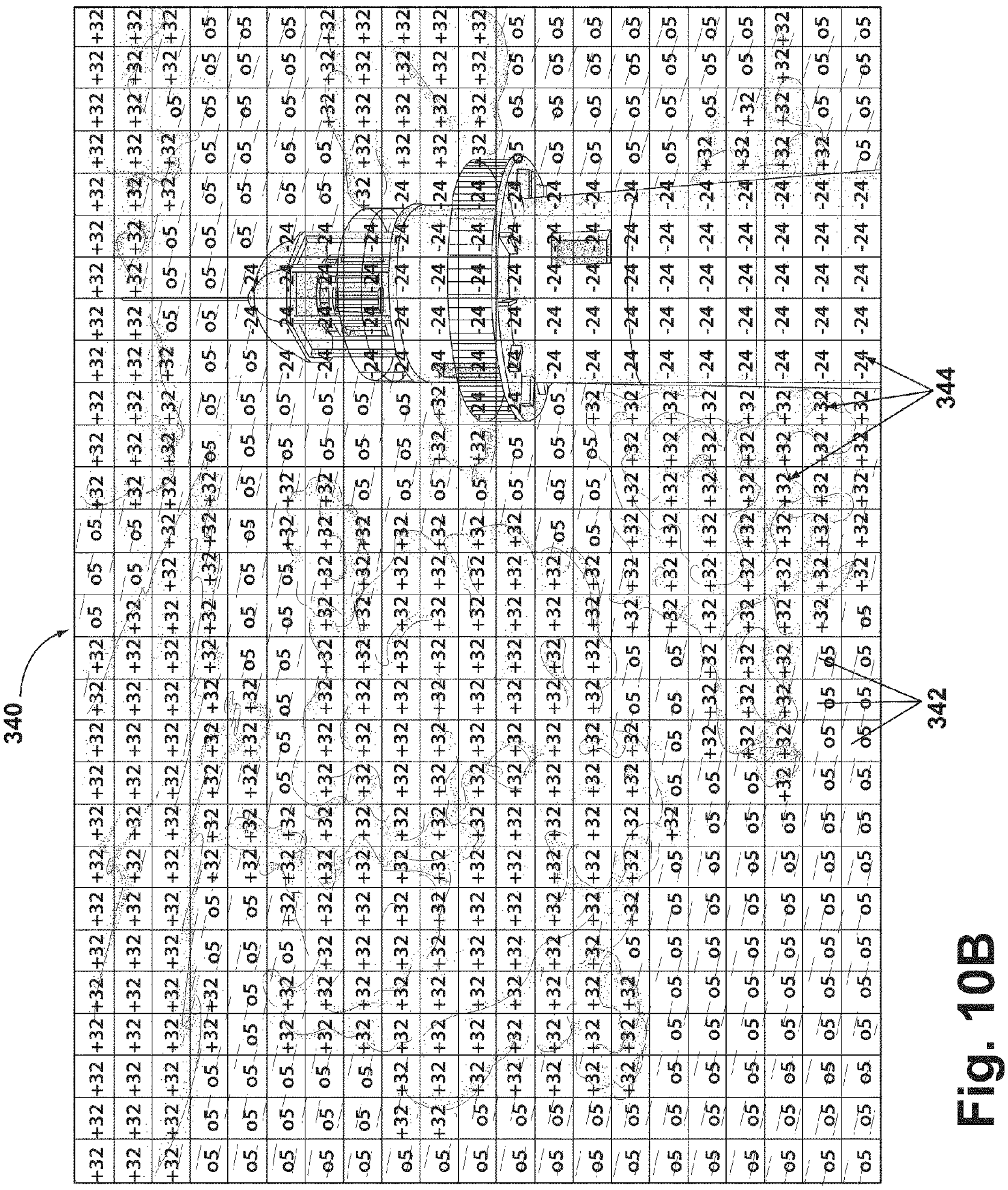
Figure 10C:
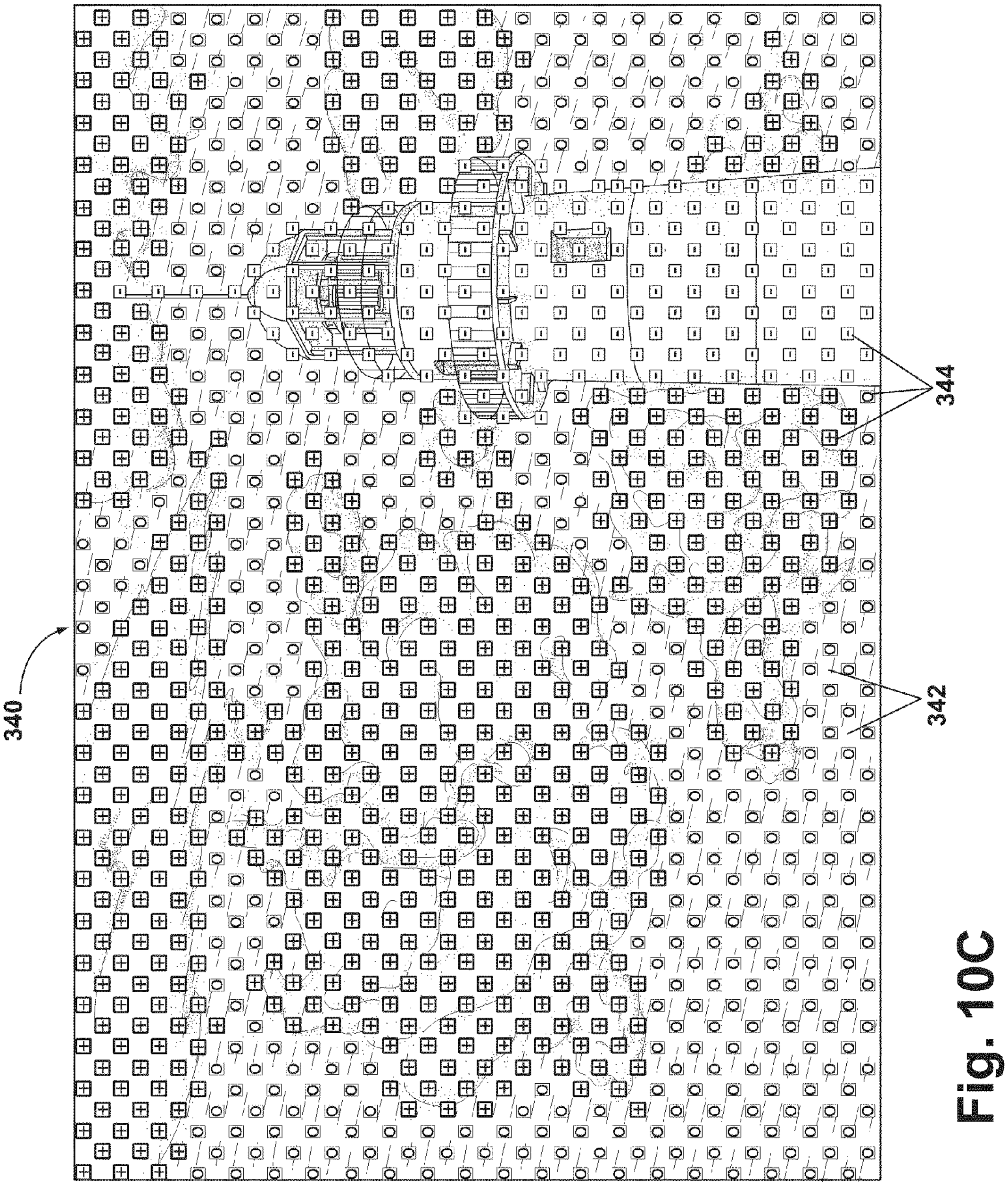

In one or more embodiments, a single 3D offset value is assigned to each discrete image block 342 that represents the perceived depth of the object as defined by that particular discrete image block 342 (e.g., one unique value 3D offset value per block 342). Any type of identification system may be used for representing the value of the 3D offset value, such as but not limited to, numerical values, alpha-numeric values, color coding, etc. For example, referring to FIG. 10B, each of the discrete image blocks 342 may include numerical values 344. FIG. 10C illustrates another representative example similar to FIG. 10B, only with a higher resolution of discrete image blocks 342 (e.g., a specific positive numerical value shown as '+' in FIG. 10C, a specific negative value shown as '−' in FIG. 10C, or zero values shown as '0' in FIG. 10C, such that a '0' value would be indicative of no offset). In one embodiment, the more negative the 3D offset value, the closer the object in the corresponding discrete image block 342 appears to the user, while the more positive the 3D offset value, the further away the object will appear to the viewer. The selection of whether negative and positive values represent being either closer to or father away from the viewer is a design characteristic and can be transposed.

Figure 11:
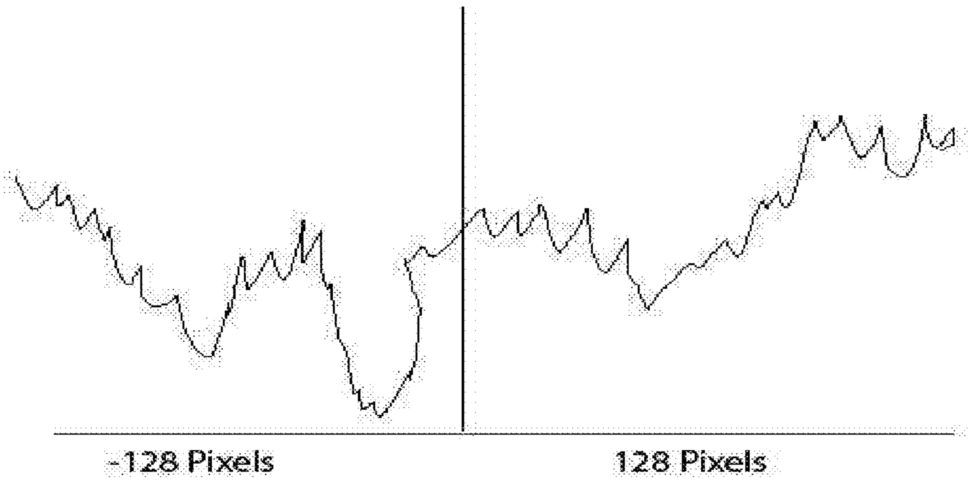
FIG. 11 is a graphical representation of the output of the range of the discrete 3D offset values generated during shifting operations performed on a discrete image block in accordance with one or more embodiments of the present disclosure.
Figure 12:
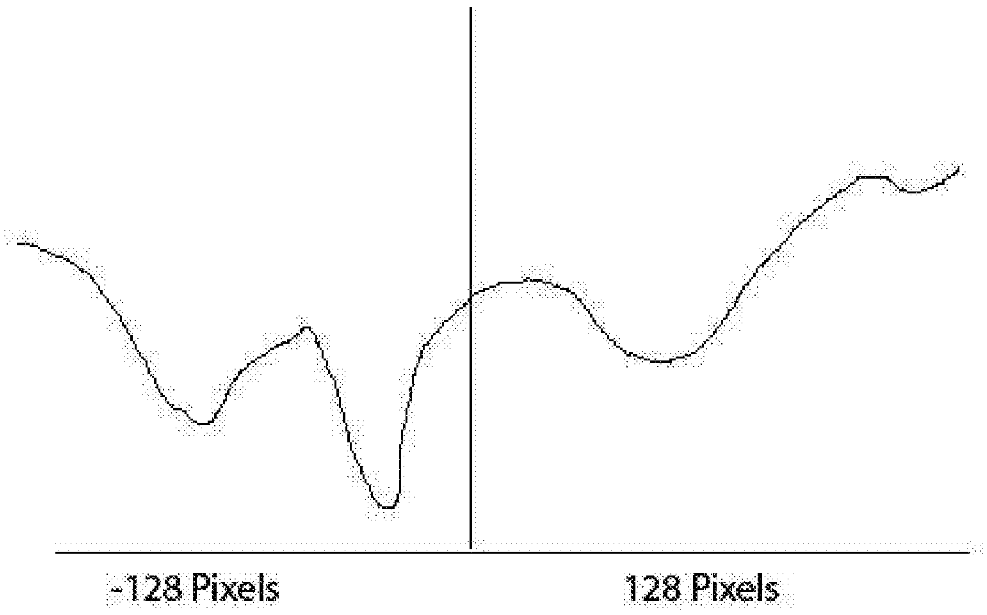
FIG. 12 is a graphical representation of the filtered results of FIG. 11.

The 3D offset value for each discrete image block 342 is calculated in operation 314 by examining differences in the left eye content 106L and right eye content 106R for the respective discrete image block 342. The left eye content 106L is shifted with respect to right eye content 106R in the respective discrete image block 342 by horizontally shifting the left eye content 106L up to 128 pixels to the left (i.e., −128 pixels) and 128 pixels to the right (+128 pixels) of its original location with respect to right eye content 106R. For each pixel that the left eye content 106L is shifted or offset, a discrete value representing the 3D offset is created by using a difference calculation between the left and right view point (i.e., difference calculation between the shifted left eye content 106L and the original right eye content 106R). A range of discrete 3D offset values is obtained for each pixel shift as the left eye content 106L is shifted from −128 pixel to +128 pixels. The resultant graph, as illustrated in FIG. 11, shows that this range of discrete 3D offset values will typically vary with shifting of the image content and will exhibit peaks and valleys of data points. The lower the value, the closer the shifted content in the block 342 match. It is understood that the calculations performed by operation 314 for each discrete image block 342 can similarly be obtained by horizontally shifting the right eye content 106R+/−128 pixels with respect to the left eye content 106L. Still further, in other embodiments, the particular number of pixels shifted can be selected to different values. In one or more embodiment, pixel shifting is specified in a proportion or percentage of display raster width. For example, a 128 pixel offset on a 2048 background would be +6.25%. This ensures that the position values will work at any display resolution and aspect ratio. Subsequent filtering operations may then be performed in operation 316 on the range of discrete 3D offset values measured from the shifting operations on the discrete image block 342 in order to smooth out instantaneous noise measurements, such as by using box filtering, Gaussian filtering, or other types of filtering techniques. A representative example of the resultant graph of the filtered results of FIG. 11 is illustrated in FIG. 12.

A "peak screening" of the graphical results or other analysis of the numerical data is performed in operation 318 in order to determine the 3D offset value in the discrete image block 342 that is the greatest, thus indicating that it is 3D offset that appears closest to the viewer for that discrete image block 342. This 3D offset value is determined by calculating the difference between the peak value from the original block location. The discrete image block 342 is then assigned this single 3D offset value representing the closest appearance to the viewer. The above-described procedures of the offset extraction process are repeated for each of the discrete image blocks 342 that make up the screen shot 340 of stereoscopic video content, where each of the discrete image blocks 342 will be assigned with their respective single 3D offset value that appears closest to the viewer. In operation 320, a 3D offset video map of the closest 3D offset values for each of the discrete image blocks 342 will be generated. For example, referring back to FIG. 10, a single numerical 3D offset value 344 is associated with each of the discrete image blocks 342, as illustrated in FIG. 10B, such that the 3D offset video map will include the collection of these 3D offset values 344 for each of the discrete image blocks 342 in each frame of the stereoscopic video content by repeating the above frame analysis for each frame of the stereoscopic video content in operation 321. In one or more embodiments, the 3D offset video map may include discrete values of the display screen width and height, the discrete image block 342 width and height, and pixels per frame of stereoscopic video content.

Figure 9:
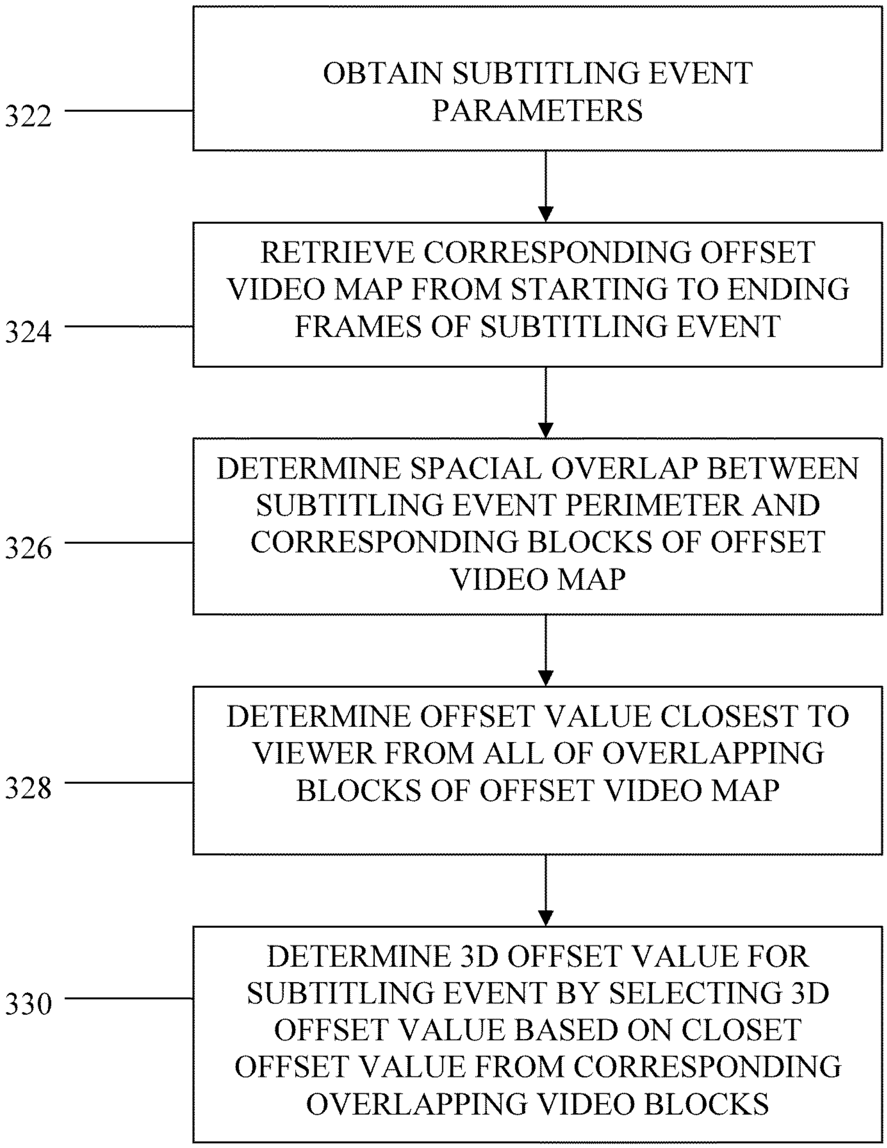
FIG. 9 is an operational flow diagram of a automated subtitle depth placement process performed by the stereoscopic subtitling workstation in accordance with one or more embodiments of the present disclosure.
Figure 13:
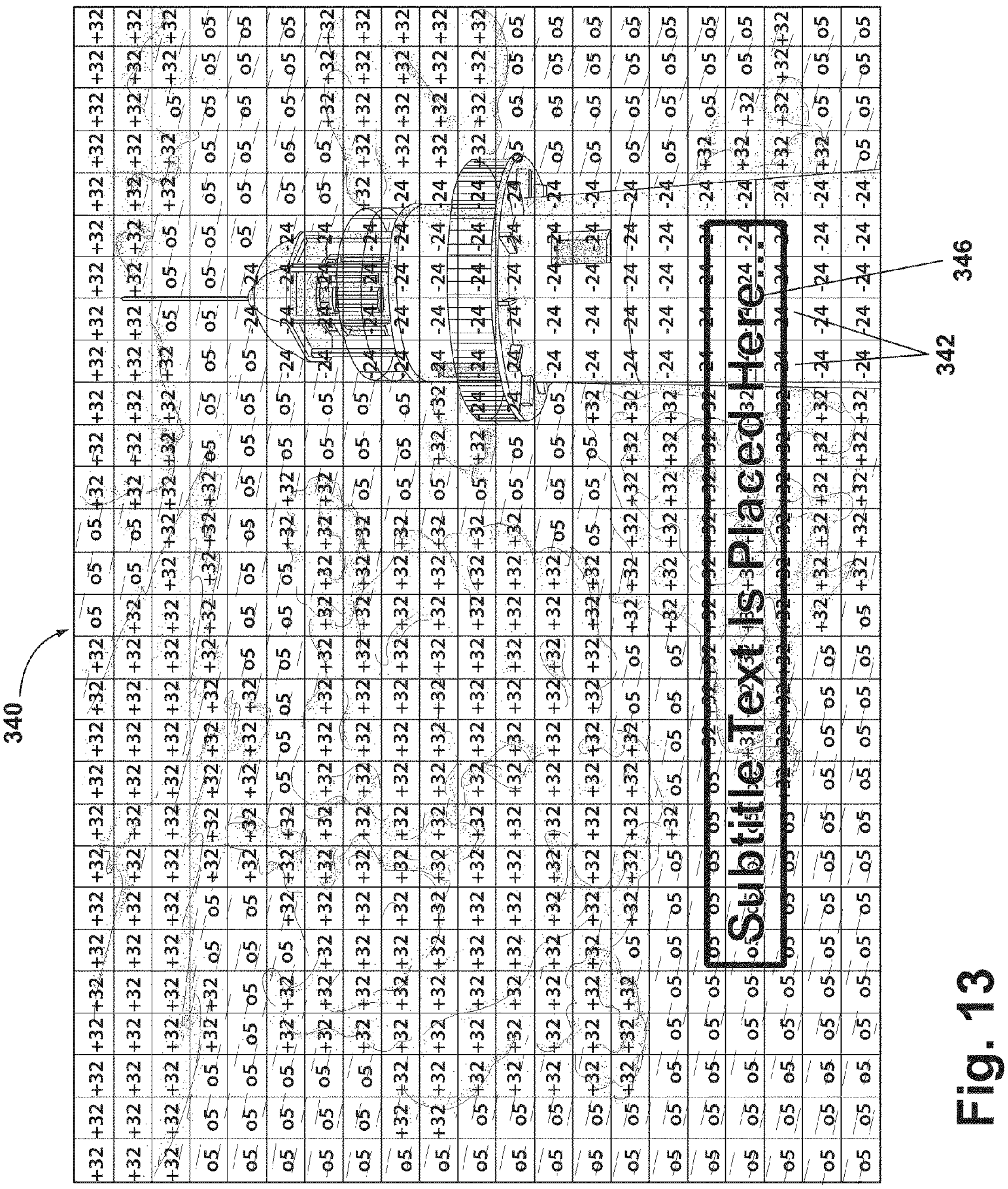
FIG. 13 is a representative frame or screen shot showing the overlap of a subtitle event with its corresponding stereoscopic video content shown divided into a plurality of discrete image blocks and in accordance with one or more embodiments of the present disclosure.

Referring now to FIG. 9, an operational flow diagram of the more specific aspects of the automated subtitle depth placement process embodied in a software module performed by the stereoscopic subtitling workstation 102 in accordance with one or more embodiments is described. This process involves utilizing the 3D offset video map and the list of subtitle events to automatically determine the desired 3D depth placement for the subtitle event. A subtitle event having certain parameters is initially obtained in operation 322 from the subtitle content 103. In one or more embodiments, a subtitle event may include a collection of start time of the subtitle, the end time of the subtitle, the width of the subtitle as it will appear on the display (e.g., the width of the subtitle bounding box), the height of the subtitle as it will appear on the display (e.g., the height of the subtitle bounding box), and the x,y position of the subtitle (or subtitle bounding box) in relation to the display on which the subtitle will be displayed. For each temporal subtitle event, the 3D offset video map for the corresponding synchronized stereoscopic video content is retrieved in operation 324 from the start frame to the end frame of the subtitle event. In operation 326, the 3D video offset map is examined from the start frame to the end frame of the subtitle event, the bounding box of the subtitle text and the x,y position of the subtitle text to determine where spacial overlap between the subtitle event and the 3D video offset map exists. Referring to the representative screen shot of FIG. 13, in which a subtitle event has been added to the screen shot 340 of video content, data values of the union between the subtitle event and the 3D offset video map (with the union being the overlap of the subtitle bounding box 346 and the underlying discrete image blocks 342) are examined in operation 328 and used to identify the 3D offset value that is closest to the viewer from all of the overlapping portions of the 3D offset video map. This closest 3D offset value is used as a basis for determining the automated depth of the subtitle plane by positioning the subtitling event slightly closer to the viewer during the subtitle event (e.g., closest 3D offset value from overlapping video content+an incremental value). In one or more embodiments, these same procedures can be implemented on a frame by frame basis instead of from a starting frame to an ending frame of video content. This 3D offset value is determined by calculating the difference between the peak value from the original block location.

In one or more embodiments, the stereoscopic subtitling workstation 102 may comprise a computer system or computer apparatus that is configured to execute software modules for performing the steps of the various algorithms and processes described herein for the real-time the creation, conversion, editing and simulation of stereoscopic subtitles for stereoscopic video content, where such software modules may be stored on a computer readable medium.

For the purposes of this disclosure a computer readable medium is a medium that stores computer data in a machine readable form. By way of example, and not limitation, a computer readable medium can include computer storage media as well as communication media or methods. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology; CD-ROM, DVD, or other optical storage; magnetic cassettes, magnetic disk storage, or other magnetic storage devices; or any other medium which can be used to tangibly store the desired information and which can be accessed by a computing system.

For the purposes of this disclosure, a “computer system” or “computer apparatus” is a system or device inclusive of a processor and memory for storing and executing program code, data, and software. Memory is a form of computer readable medium including random access memory, read only memory, and dynamic random access memory, to name a few. Computing systems can be provided with operating systems that allow the execution of software application sin order to manipulate data. Computing systems can include input devices or input peripherals (e.g., keyboard, touch screens, mouse, joystick, and microphone) and output device or output peripherals (e.g., monitor, display, printer, and speaker). Personal computers, PDA’s, wireless devices, cell phones, internet appliances, media players, home theatre systems, and media centers are several non-limiting examples of computing systems.

For the purposes of this disclosure, a “processor” is a logic machine or a component of a computing system capable of executing computer programs or computer instructions.

For the purposes of this disclosure, a “module” is a software, hardware, or firmware (or combinations thereof) system, process of functionality, or component thereof, that performs or facilitates the processes, features, and/or functions described herein (with or without human interaction or augmentation). A module can include sub-modules.

Various implementations of the systems, apparatus and methods described herein can be realized in digital electronic circuitry, integrated circuitry, specially designed ASICs (application-specific integrated circuits), FPGAs (Field Programmable Gate Arrays), computer hardware, firmware, software, and/or combinations thereof. These various implementations can include one or more computer programs that are executable and/or interpretable on a programmable system including at least one programmable processor, which can be special or general purpose, coupled to receive data and instructions from, and to transmit data and instructions to, a storage system, at least one input device, and at least one output device. Such computer programs (also known as programs, software, software applications or code) can include machine instructions for a programmable processor, and can be implemented in any form of programming language, including high-level procedural and/or object-oriented programming languages, and/or in assembly/machine languages. A computer program can be deployed in any form, including as a stand-alone program, or as a module, component, subroutine, or other unit suitable for use in a computing environment. A computer program can be deployed to be executed or interpreted on one computer or on multiple computers at one site, or distributed across multiple sites and interconnected by a communication network.

Digital Cinema

In one or more embodiments, the stereoscopic subtitling workstation 102 may be utilized for the production of stereoscopic subtitling content for motion picture releases in Digital Cinema ("D-Cinema") or other similar digital motion picture formats that are used for theatrical releases. In this representative example, the stereoscopic video content source 104 may comprise a D-cinema production replay system (e.g., 2k Stereoscopic Replay Device with Timecode or the like) while the stereoscopic output device 116 may comprise a 3D D-Cinema projector (e.g., Texas Instruments DC2K Digital Cinema Projector or the like). The stereoscopic subtitling workstation 102 is connected through any type of wired or wireless connection to both the D-cinema production replay system 104 and the 3D D-Cinema projector 116. The D-cinema production replay system 104 reads stereoscopic video content from a D-cinema hard drive and outputs left and right eye video content to the stereoscopic subtitling workstation 102 for real-time processing of subtitles using the various systems, apparatus, and methods described herein. In one or more embodiments, the display screen 118 utilized for this type of stereoscopic video content would comprise a theater screen and the viewer would be situated within a theater replay screen room so as to simulate a similar viewing environment in which the motion picture having stereoscopic video content would be typically viewed in a theater. For example, the viewer could be wearing 3D Infra-Red Active LCD Glasses or other types of 3D viewing devices.

Blu-ray 3D

In one or more embodiments, the stereoscopic subtitling workstation 102 may be utilized for the production of stereoscopic subtitling content for Blu-ray 3D motion picture titles. With the recent standardization of Blu-ray 3D along with the release of Blu-ray 3D disc players and 3D televisions, there will soon be growing demand for motion pictures to be released and distributed with stereoscopic video content in Blu-ray 3D format. This will put an even greater demand for efficiency and time and cost savings to be achieved for preparing the stereoscopic subtitling for such Blu-ray 3D stereoscopic video content. The present stereoscopic subtitling workstation 102 described herein may be utilized to provide this efficiency in preparing stereoscopic subtitling for various language version releases.

In this representative example, the stereoscopic video content source 104 may comprise a Blu-ray 3D disc player is connected to communicate with the stereoscopic subtitling workstation 102 through any type of wired or wireless connection. The Blu-ray 3D disc player reads stereoscopic video content from a Blu-ray 3D disc and outputs left and right eye video content to the stereoscopic subtitling workstation 102 for real-time processing of subtitles using the various systems, apparatus, and methods described herein. In one or more embodiments, the display screen 118 utilized for this type of stereoscopic video content would comprise a television display or computer display so as to simulate a similar viewing environment in which the Blu-ray 3D video content would be typically viewed. In one or more embodiments, the stereoscopic video content source 104 may comprise of stereoscopic video files in place of a Blu-ray 3D disc player.

3D Broadcasts

Stereoscopic video content may further be broadcast over various broadcast communication means, such as television, cable, satellite, the Internet, wirelessly to computing devices and hand held mobile devices. In one or more embodiments, the stereoscopic subtitling workstation 102 may further be utilized to prepare stereoscopic subtitling for such broadcast stereoscopic video content by either pre-processing the stereoscopic subtitling content prior to broadcasting such content or by positioning the stereoscopic subtitling workstation 102 somewhere in the broadcast distribution stream before reaching the viewer's respective display (e.g., television, computer, mobile device, etc.). The automatic subtitling placement mechanism of the stereoscopic subtitling workstation 102 allows stereoscopic subtitles to be prepared in substantially real-time on-the-fly as content is being broadcast, subject to the limitation that, in many instances, further fine tuning of the subtitling parameters may not be able to be performed and reliance would be made on the parameters chosen by the automatic subtitling placement mechanism. The automatic subtitling placement mechanism of the stereoscopic subtitling workstation 102 may employ different programmable default placement settings based on a number of criteria, included, but not limited to, the type of content being broadcast and the type of display on which the content is displayed.

The various embodiments described herein set forth systems, apparatus and methods for the creation, conversion, editing, manipulation and viewing of stereoscopic subtitles for stereoscopic video content in substantially real-time that significantly reduce the time, costs and labor associated with preparing such stereoscopic subtitling. For example, with respect to the recent blockbuster motion picture release Avatar (in 3D), the present systems, apparatus and methods for preparing stereoscopic subtitling described herein were employed for this 3D motion picture by the assignee of the present invention for the nearly 100 release versions containing stereoscopic subtitles in a variety of different languages, where the stereoscopic subtitles were able to be completed for these 100 releases many times faster than if the prior conventional subtitling techniques had been employed. Further, the automatic subtitling placement mechanism described herein (e.g., automatically estimating 3D offset values for stereoscopic subtitling content based on the corresponding stereoscopic video content) has greatly reduced the requirements for human manipulation and/or interaction, thereby substantially reducing costs, time, and labor for preparing subtitling for stereoscopic content.

For the purposes of this disclosure, the term "substantially real-time," as it is used with respect to the various embodiments of the systems, apparatus and methods for the creation, conversion, editing, manipulation and viewing of stereoscopic subtitles for stereoscopic video content described herein, shall refer to the ability of the stereoscopic subtitling workstation 102 or a user of the stereoscopic subtitling workstation 102 to select and/or manipulate the parameters for the stereoscopic subtitling content so that the results of the selection and/or manipulation of such subtitling parameters are observable near instantaneously with their selection and/or manipulation. For example, after the parameters for the stereoscopic subtitling are selected or manipulated, the combined stereoscopic subtitling/video content can be displayed for immediately played and displayed to observe the interaction between the stereoscopic subtitling content and the corresponding stereoscopic video content.

While the various embodiments described herein have been described with respect to preparing stereoscopic subtitling content for its corresponding stereoscopic video content, it is understood that the various embodiments described herein can be modified so that other types of content, such as graphics or other types of video content, can be similarly prepared and analyzed observe the interaction between such other types of stereoscopic content and the underlying stereoscopic video content.

While the system and method have been described in terms of what are presently considered to be specific embodiments, the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A computer-implemented method comprising:

receiving stereoscopic video content;

receiving subtitling content associated with the stereoscopic video content;

selecting stereoscopic viewing parameters for the subtitling content and preparing stereoscopic subtitling content based on the selected parameters;

combining the stereoscopic video content with the stereoscopic subtitling content together into combined stereoscopic video/subtitling content;

displaying the combined stereoscopic video/subtitling content on a display screen for viewing stereoscopically so that the three-dimensional (3D) interaction between the stereoscopic video content and the stereoscopic subtitling content can be observed; and allowing the stereoscopic viewing parameters for the stereoscopic subtitling content to be manipulated in substantially real-time and the effects of such manipulation on the combined stereoscopic video/subtitling content to be observed in substantially real-time, wherein manipulating the stereoscopic viewing parameters for the stereoscopic subtitling content does not affect the stereoscopic video content.

2. The computer-implemented method of claim 1, further comprising:

receiving subtitling content as two-dimensional (2D) content;

converting the 2D subtitling content into stereoscopic subtitling content by preparing left eye subtitle content and right eye subtitle content from the 2D subtitling content and selecting a parallax offset between the left eye subtitle content and right eye subtitle content.

3. The computer-implemented method of claim 2, wherein the stereoscopic video content includes left eye video content and right eye video content, the computer-implemented method further comprising combining the stereoscopic video content with the stereoscopic subtitling content together by:

combining the left eye video content with corresponding left eye subtitle content; and combining the right eye video content with corresponding right eye subtitle content.

4. The computer-implemented method of claim 1, further comprising:

stereoscopically observing the three-dimensional (3D) interaction between the stereoscopic video content and the stereoscopic subtitling content in the displayed combined stereoscopic video/subtitling content;

determining manipulations to the stereoscopic viewing parameters that will improve a desired appearance of the stereoscopic subtitling content with respect to the stereoscopic video content;

manipulating the stereoscopic viewing parameters in substantially real-time to the display of the combined stereoscopic video/subtitling content; and observing the effects of such manipulation of the stereoscopic viewing parameters on the combined stereoscopic video/subtitling content in substantially real-time to their manipulation.

5. The computer-implemented method of claim 1, further comprising:

providing a graphical user interface (GUI) with selectable controls that allow the stereoscopic viewing parameters for the subtitling content to be selected and manipulated.

6. The computer-implemented method of claim 1, wherein the stereoscopic viewing parameters for the subtitling content include text effects that enhance the legibility of the subtitling content when displayed.

7. The computer-implemented method of claim 1, further comprising:

selecting the stereoscopic viewing parameters for the subtitling content automatically based on stereoscopic characteristics of the stereoscopic video content.

8. The computer-implemented method of claim 7, wherein the subtitling content comprises a plurality of temporal subtitling events, the computer-implemented method further comprising:

performing an offset extraction process for extracting 3D offset information from at least a portion of the stereoscopic video content corresponding to a subtitling event; and performing an automated subtitle depth placement process for automatically determining a desired 3D offset for the stereoscopic subtitling content based on the extracted 3D offset information from the stereoscopic video content, wherein the desired 3D offset comprises one of the selected stereoscopic viewing parameters for the subtitling content.

9. The computer-implemented method of claim 8, further comprising manipulating the automatically determined 3D offset for the stereoscopic subtitling content to alter the three-dimensional (3D) interaction between the stereoscopic video content and the stereoscopic subtitling content.

10. The computer-implemented method of claim 1, further comprising:

receiving previously stored stereoscopic viewing parameters for different subtitling content that is also associated with the same stereoscopic video content;

using the previously stored stereoscopic viewing parameters for the different subtitling content as initially selected stereoscopic viewing parameters for the subtitling content currently being prepared; and determining manipulations to the stereoscopic viewing parameters that will improve the desired appearance of the stereoscopic subtitling content currently being prepared with respect to the stereoscopic video content.

11. A computing device for performing subtitling for stereoscopic content, comprising:

an input for receiving stereoscopic video content;

an input for receiving subtitling content associated with the stereoscopic video content;

a processor;

a readable storage media for tangibly storing thereon computer readable instructions executable by the processor for:

selecting stereoscopic viewing parameters for the subtitling content and preparing stereoscopic subtitling content based on the selected parameters;

combining the stereoscopic video content with the stereoscopic subtitling content together into combined stereoscopic video/subtitling content;

displaying the combined stereoscopic video/subtitling content on a display screen for viewing stereoscopically so that the three-dimensional (3D) interaction between the stereoscopic video content and the stereoscopic subtitling content can be observed; and allowing the stereoscopic viewing parameters for the stereoscopic subtitling content to be manipulated in substantially real-time and the effects of such manipulation on the combined stereoscopic video/subtitling content to be observed in substantially real-time, wherein manipulating the stereoscopic viewing parameters for the stereoscopic subtitling content does not affect the stereoscopic video content.

12. The computing device of claim 11, wherein the subtitling content is received as two-dimensional (2D) content, the computer readable instructions further executable by the processor for:

converting the 2D subtitling content into stereoscopic subtitling content by preparing left eye subtitle content and right eye subtitle content from the 2D subtitling content and selecting a parallax offset between the left eye subtitle content and right eye subtitle content.

13. The computing device of claim 12, wherein the stereoscopic video content includes left eye video content and right eye video content, wherein the computer readable instructions are further executable by the processor for combining the stereoscopic video content with the stereoscopic subtitling content together by:

combining the left eye video content with corresponding left eye subtitle content; and combining the right eye video content with corresponding right eye subtitle content.

14. The computing device of claim 11, wherein the computer readable instructions are further executable by the processor for:

stereoscopically observing the three-dimensional (3D) interaction between the stereoscopic video content and the stereoscopic subtitling content in the displayed combined stereoscopic video/subtitling content;

determining manipulations to the stereoscopic viewing parameters that will improve a desired appearance of the stereoscopic subtitling content with respect to the stereoscopic video content;

manipulating the stereoscopic viewing parameters in substantially real-time to the display of the combined stereoscopic video/subtitling content; and observing the effects of such manipulation of the stereoscopic viewing parameters on the combined stereoscopic video/subtitling content in substantially real-time to their manipulation.

15. The computing device of claim 11, further comprising: a graphical user interface (GUI) with selectable controls that allow the stereoscopic viewing parameters for the subtitling content to be selected and manipulated.

16. The computing device of claim 11, wherein the stereoscopic viewing parameters for the subtitling content include text effects that enhance the legibility of the subtitling content when displayed.

17. The computing device of claim 11, wherein the computer readable instructions are further executable by the processor for:

selecting the stereoscopic viewing parameters for the subtitling content automatically based on stereoscopic characteristics of the stereoscopic video content.

18. The computing device of claim 17, wherein the subtitling content comprises a plurality of temporal subtitling events, wherein the computer readable instructions are further executable by the processor for:

performing an offset extraction process for extracting 3D offset information from at least a portion of the stereoscopic video content corresponding to a subtitling event; and performing an automated subtitle depth placement process for automatically determining a desired 3D offset for the stereoscopic subtitling content based on the extracted 3D offset information from the stereoscopic video content, wherein the desired 3D offset comprises one of the selected stereoscopic viewing parameters for the subtitling content.

19. The computing device of claim 18, wherein the computer readable instructions are further executable by the processor for manipulating the automatically determined 3D offset for the stereoscopic subtitling content to alter the three-dimensional (3D) interaction between the stereoscopic video content and the stereoscopic subtitling content.

20. The computing device of claim 11, wherein the computer readable instructions are further executable by the processor for:

receiving previously stored stereoscopic viewing parameters for different subtitling content that is also associated with the same stereoscopic video content;

using the previously stored stereoscopic viewing parameters for the different subtitling content as initially selected stereoscopic viewing parameters for the subtitling content currently being prepared; and determining manipulations to the stereoscopic viewing parameters that will improve the desired appearance of the stereoscopic subtitling content currently being prepared with respect to the stereoscopic video content.

21. The method of claim 1 wherein the manipulated stereoscopic viewing parameters for the stereoscopic subtitling content is stored in a subtitle file for subsequent utilization.

* * * * *

UNITED STATES PATENT AND TRADEMARK OFFICE

CERTIFICATE OF CORRECTION

PATENT NO. : 8,436,918 B2
APPLICATION NO. : 12/713685
DATED : May 7, 2013
INVENTOR(S) : Claydon et al.

It is certified that error appears in the above-identified patent and that said Letters Patent is hereby corrected as shown below:

On Title Page 2, Item [56] OTHER PUBLICATIONS, line 3, delete "Steroscopic" and insert --Stereoscopic--.

Signed and Sealed this
Seventeenth Day of September, 2013

Teresa Stanek Rea
*Deputy Director of the United States Patent and Trademark Office*